United States Patent [19]

Monteiro et al.

[11] Patent Number: 6,119,163
[45] Date of Patent: Sep. 12, 2000

[54] MULTICASTING METHOD AND APPARATUS

[75] Inventors: Antonio M Monteiro; James F Butterworth, both of New York, N.Y.

[73] Assignee: Netcast Communications Corporation, New York, N.Y.

[21] Appl. No.: 09/435,732

[22] Filed: Nov. 8, 1999

Related U.S. Application Data

[63] Continuation of application No. 09/110,369, Jul. 6, 1998, which is a continuation of application No. 08/644,072, May 9, 1996, Pat. No. 5,778,187.

[51] Int. Cl.⁷ .................................................. H04L 12/00
[52] U.S. Cl. ........................ 709/227; 709/238; 709/250
[58] Field of Search .................................. 709/227, 238, 709/250

[56] References Cited

U.S. PATENT DOCUMENTS

| | | | |
|---|---|---|---|
| 4,546,382 | 10/1985 | McKenna et al. | 384/84 |
| 5,105,184 | 4/1992 | Pirani et al. | 345/115 |
| 5,132,992 | 7/1992 | Yurt et al. | 375/122 |
| 5,155,591 | 10/1992 | Wachob | 358/86 |
| 5,220,501 | 6/1993 | Lawlor et al. | 364/408 |
| 5,283,731 | 2/1994 | Lalonde et al. | 364/401 |
| 5,305,195 | 4/1994 | Murphy | 364/401 |
| 5,319,455 | 6/1994 | Hoarty et al. | 348/7 |
| 5,347,632 | 9/1994 | Filepp et al. | 395/200 |
| 5,361,256 | 11/1994 | Doeringer et al. | 370/60 |
| 5,414,773 | 5/1995 | Handelman | 380/49 |
| 5,446,919 | 8/1995 | Wilkins | 455/52 |
| 5,493,514 | 2/1996 | Keith et al. | 364/514 R |
| 5,604,562 | 2/1997 | Dedrisk | 348/552 |
| 5,617,565 | 4/1997 | Augenraun et al. | 395/604 |
| 5,649,013 | 7/1997 | Stuckey et al. | 380/4 |
| 5,675,510 | 10/1997 | Coffey et al. | 364/564 |
| 5,706,290 | 1/1998 | Shaw et al. | 370/465 |
| 5,778,187 | 7/1998 | Monteiro et al. | 395/200.61 |
| 5,862,329 | 1/1999 | Aras et al. | 395/200.34 |
| 5,878,384 | 3/1999 | Johnson et al. | 702/187 |
| 5,928,331 | 7/1999 | Bushmitch | 709/231 |
| 5,930,254 | 7/1999 | Liron et al. | 370/395 |
| 5,930,493 | 7/1999 | Ottesen et al. | 348/7 |
| 5,931,961 | 8/1999 | Ranganathan et al. | 714/712 |
| 5,936,940 | 8/1999 | Marin et al. | 370/232 |
| 5,983,005 | 11/1999 | Monteiro et al. | 395/200.61 |

OTHER PUBLICATIONS

K. Savetz et al. MBONE Multicasting Tomorrow's Internet (IDG Books worldwide Inc., 1996). Chapters 1–3; Appendixes A and B.

D.P. Brutzman et al., "MBONE Provides Audio and Video Across the Internet," IEEE Computer, vol. 27, No. 4, pp. 30–36 (Apr. 1994).

PCT International Search Report, International Application No. PCT/US97/07893.

(List continued on next page.)

*Primary Examiner*—Thomas R. Peeso
*Attorney, Agent, or Firm*—Pennie & Edmonds LLP

[57] ABSTRACT

A scalable architecture is disclosed for delivery of real-time information over a communications network. Embedded into the architecture is a control mechanism that provides for the management and administration of users who are to receive the real-time information. In the preferred embodiment, the information being delivered is high-quality audio. However, it could also be video, graphics, text or any other type of information that can be transmitted over a digital network. Preferably, there are multiple channels of information available simultaneously to be delivered to users, each channel consisting of an independent stream of information. A user chooses to tune in or tune out a particular channel, but does not choose the time at which the channel distributes its information. Advantageously, interactive (two-way) information can be incorporated into the system, multiple streams of information can be integrated for delivery to a user, and certain portions of the information being delivered can be tailored to the individual user.

30 Claims, 23 Drawing Sheets

OTHER PUBLICATIONS

RealAudio Server, Administrator's Guide, Release 2.0. Progressive Networks, Inc.
RealAudio, Administrator's Guide, Release 1.1.
RealAudio Signs Deal with Netscape—Apr. 12, 1995.
Progressive Networks ships RealAudio—Jul. 25, 1995.
Microsoft, Spry and Spryglass to Include RealAudio—Apr. 12, 1995.
April Bundles Real Audio Player—Aug. 7, 1995.
24–Hour ABC News on the Net—Aug. 15, 1995.
Ziff–Davis Adds RealAudio to ZD Net—Aug. 16, 1995.
Progressive Networks' Real Audio Player has exclusive with Microsoft's Internet Explorer—Aug. 17, 1995.
Progressive Networks Announces "Live RealAudio" System—Aug. 30, 1995.
ABC RadioNet first to fully integrate live RealAudio—Sep. 7, 1995.
RTHK pioneers the use of Live RealAudio technology, Sep. 14, 1995.
Progressive Networks Announces RealAudio Personal Server—Oct. 9, 1995.
Progressive networks Receives Second Round of External Financing $5.7 Million Led by Accel partners—Oct. 30, 1995.
CheckPoint Software Breaks the Sound Barrier with Integrated Support for RealAudio—Dec. 5, 1995.
Progressive Networks Introduces Version 2.0 of the RealAudio System—Oct. 30, 1995.
Atlantic Records, CDnow, Electra Records, InTouch Group Inc., MCA Records, Muzak and Warner Bros. Records among first users of Progressive Networks' Real Audio version 2.0—Dec. 4, 1995.
Progressive Netorks to broadcast the Live and In Concert—Jan. 4, 1996.
Microsoft and Progressive Networks demonstrate first OLE–enabled Internet browser to incorporate RealAudio—Dec. 7, 1995.
Progressive Networks Announces RealAudio Server Products for Macintosh—Jan. 10, 1996.
Trusted Information Systems Enhances Industry Leading Gauntlet Internet Firewall—Jan. 23, 1996.
Border Network Technologies Provides Secure Support for RealAudio—Jan. 24, 1996.
Progressive Networks Announces Open RealAudio Architecture—Jan. 31, 1996.
RealAudio™ Server Software to be Bundled with newest Line of Apple Internet Servers—Feb. 27, 1996.
Bruce Jacobsen named President and Chief Operating Officer of Progressive Networks—Feb. 21, 1996.
GTA Announces RealAudio Support for the GFX Internet Firewall System—Mar. 1, 1996.
Morning Star's SecureConnect Technology Provides Internet Users of Real Audio With Sound Security—Mar. 4, 1996.
Progressive Networks and Microsoft Announce Streaming Media Agreement—Mar. 12, 1996.
Progressive Networks Announces RealAudio Firewall Proxy Kit—Apr. 2, 1996.
Progressive Networks Launches RealAudio 2.0 Intranet Offerings with Corporate Licensing Program and Intranet Server Pricing—Apr. 2, 1996.
Progressive Networks Ships Final Version of RealAudio System 2.0 with Open Architecture Enhancements and Ability to Deliver Synchronized Multimedia Capabilities—Apr. 2, 1996.
Progressive Networks Launches Timecast: The RealAudio Guide—Apr. 29, 1996.
RealAudio Wins Internet World magazine Outstanding Software Product of the Year Aware—Apr. 30, 1996.

| REQUEST FROM | REQUEST TO | VALIDATION WITH |
|---|---|---|
| USER | CONTROL SERVER | ADMINISTRATION SERVER |
| USER | MEDIA SERVER | CONTROL SERVER |
| MEDIA SERVER | MEDIA SERVER | CONTROL SERVER |
| MEDIA SERVER | PRIMARY SERVER | ADMINISTRATION SERVER |
| MEDIA SERVER | CONTROL SERVER | ADMINISTRATION SERVER |
| CONTROL SERVER | MEDIA SERVER | ADMINISTRATION SERVER |

(SHOWN ABOVE)

FIG. 9B

MULTICASTING METHOD AND APPARATUS

This is a continuation, of application Ser. No. 09/110,369, filed Jul. 6, 1998, which is a continuation of application Ser. No. 08/644,072, filed May 9, 1996 (now U.S. Pat. No. 5,778,187), and such applications are hereby incorporated by reference.

FIELD OF THE INVENTION

This relates to a method and apparatus for providing audio and/or visual communication services, in real-time to a multiplicity of identifiable users on a communications network, such as the Internet. In a preferred embodiment, the invention monitors which users are receiving signals on which one of a plurality of channels and modifies the content of at least some signals in response thereto. A particular application is to provide services akin to multi-channel radio or television with commercial programming content adjusted in accordance with the identity of the individual user.

BACKGROUND OF THE INVENTION

Systems such as the Internet typically are point-to-point (or unicast) systems in which a message is converted into a series of addressed packets which are routed from a source node through a plurality of routers to a destination node. In most communication protocols the packet includes a header which contains the addresses of the source and the destination nodes as well as a sequence number which specifies the packet's order in the message.

In general, these systems do not have the capability of broadcasting a message from a source node to all the other nodes in the network because such a capability is rarely of much use and could easily overload the network.

However, there are situations where it is desirable for one node to communicate with some subset of all the nodes. For example, multi-party conferencing capability analogous to that found in the public telephone system and broadcasting to a limited number of nodes are of considerable interest to users of packet-switched networks. To satisfy such demands, packets destined for several recipients have been encapsulated in a unicast packet and forwarded from a source to a point in a network where the packets have been replicated and forwarded on to all desired recipients. This technique is known as IP Multicasting and the network over which such packets are routed is referred to as the Multicast Backbone or MBONE. More recently, routers have become available which can route the multicast addresses (class D addresses) provided for in communication protocols such as TCP/IP and UDP/IP. A multicast address is essentially an address for a group of host computers who have indicated their desire to participate in that group. Thus, a multicast packet can be routed from a source node through a plurality of multicast routers (or mrouters) to one or more devices receiving the multicast packets. From there the packet is distributed to all the host computers that are members of the multicast group.

These techniques have been used to provide on the Internet audio and video conferencing as well as radio-like broadcasting to groups of interested parties. See, for example, K. Savetz et al. *MBONE Multicasting Tomorrow's Internet* (IDG Books WorldWide Inc., 1996).

Further details concerning technical aspects of multicasting may be found in the Internet documents Request for Comments (RFC) 1112 and 1458 which are reproduced at Appendices A and B of the Savetz book and in D. P. Brutaman et al., "MBONE provides Audio and Video Across the Internet," *IEEE Computer*, Vol. 27, No. 4, pp. 30–36 (April 1994), all of which are incorporated herein by reference.

Citation of the foregoing documents is not to be construed as an admission that any of such documents is a prior art publication relative to the present invention.

SUMMARY OF THE INVENTION

The present invention is a scalable architecture for delivery of real-time information over a communications network. Embedded into the architecture is a control mechanism that provides for the management and administration of users who are to receive the real-time information.

In the preferred embodiment, the information being delivered is high-quality audio. However, it could also be video, graphics, text or any other type of information that can be transmitted over a digital network. This information is delivered in real-time to any number of widely distributed users. It is real-time in that for a given channel of information, approximately the same information is being sent at approximately the same time to everyone who is enabled to receive the information.

Preferably, there are multiple channels of information available simultaneously to be delivered to users, each channel consisting of an independent stream of information. A user chooses to tune in or tune out a particular channel, but does not choose the time at which the channel distributes its information. Advantageously, interactive (two-way) information can be incorporated into the system, multiple streams of information can be integrated for delivery to a user, and certain portions of the information being delivered can be tailored to the individual user.

BRIEF DESCRIPTION OF THE DRAWING

These and other objects, features and advantages of our invention will be more readily apparent from the following Detailed Description of a Preferred Embodiment of our invention in which.

Where the same reference numerals appear in multiple drawings, the numerals refer to the same or corresponding structure in such drawings.

DETAILED DESCRIPTION OF THE PREFERRED EMBODIMENT

Figure 1:
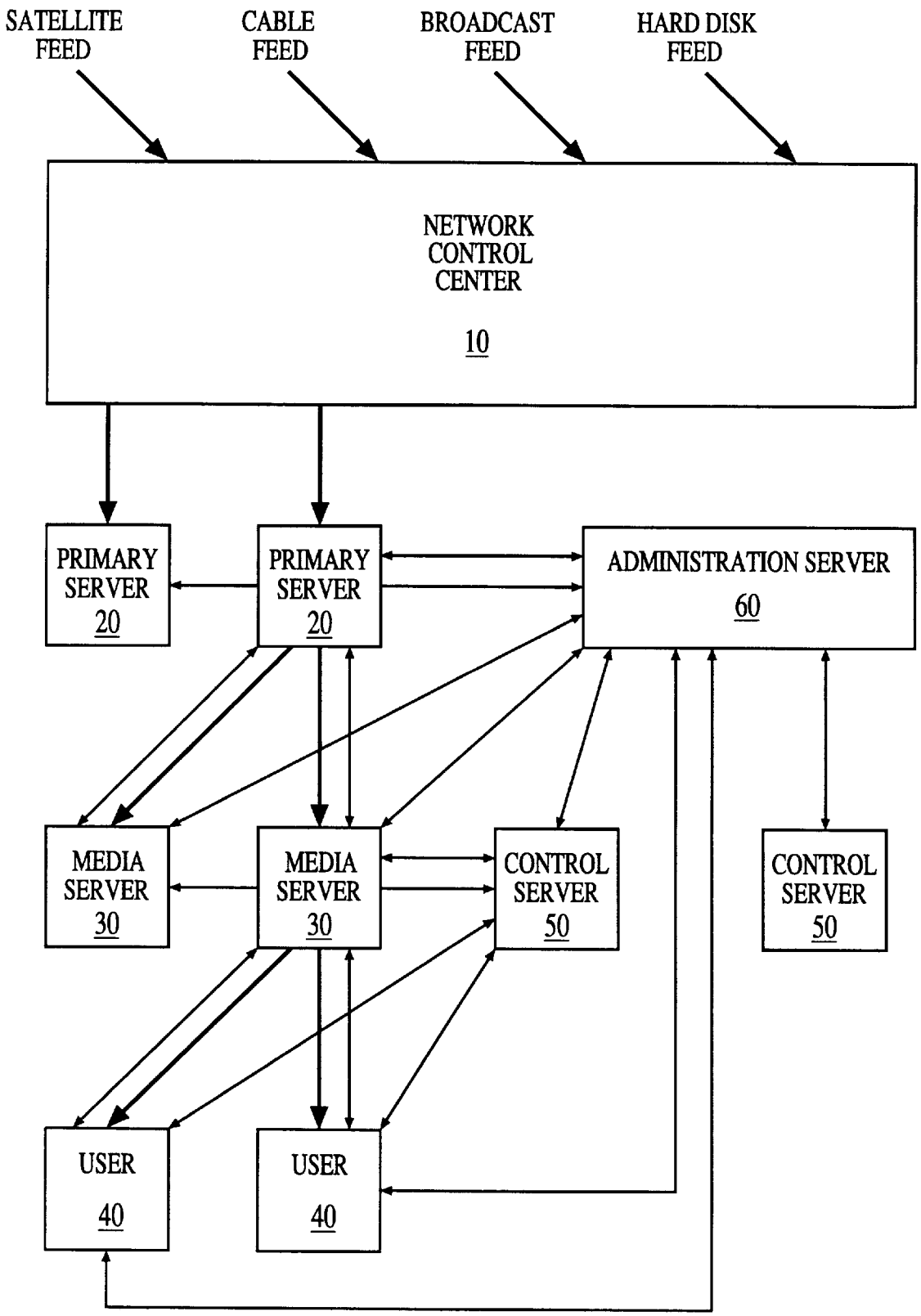
FIG. 1 is a schematic diagram depicting an overview of the system of the present invention.

Referring to FIG. 1, the system of the present invention comprises a Network Control Center 10, a plurality of Primary Servers 20, Media Servers 30, Users 40 and Control Servers 50 and an Administration Server 60. The servers are interconnected by a communications network, which in the preferred embodiment is the global connected internetwork known as the Internet. The Network Control Center 10 is the source of the information being distributed. It receives audio feeds from satellite, over the air broadcast or in other ways and processes this information for delivery over the network on multiple channels of information. This processing consists of optionally recording the information for future broadcast and dynamically inserting paid commercial advertisements.

For each channel of information, there is a Primary Server 20 that receives the stream of information from the Network Control Center 10 and compresses the information stream to allow for more efficient transmission. The Primary Servers 20 are directly connected to the network.

The Primary Servers forward information via the network to a number of Media Servers 30. There may be a large number of Media Servers and in fact there may be many levels of Media Servers. For example, a Media Server which receives a stream of information from a Primary Server may forward that stream via the network to another Media Server which then forwards it to a User 40. This multilevel hierarchical structure is described in more detail below.

The topology of the Internet dictates the ideal placement of Media Servers, the fan-out of each Media Server and the number of levels of Media Servers between the Primary Server and Users. For example, the Media Servers which feed from a Primary Server might be placed at a major points of presence (POPs) of each of the large Internet service providers. These Media Servers might also be placed near clouds which serve as high bandwidth exchange points between the major carriers. Similarly, Media Servers which feed to Users might be placed on or close to networks which have a large number of subscribers to minimize the distance and number of data streams being transmitted.

Control Servers 50 are responsible for keeping track of which Users are listening to which channels and for directing the Media Servers to start and stop streams of information to those Users. The Control Servers are also responsible for handling other interactions among the various components of the system as will be described in more detail below. Each Control Server is responsible for managing a cluster of Media Servers; and each Media Server is managed by a single Control Server at any given time. As a result, the Control Servers are distributed throughout the Internet, preferably located close to the Media Servers.

The Administration Server 60 is responsible for registering new Users, authenticating Users who want to log onto the system, and maintaining audit logs for how many Users are listening to which channels and at which times. Maintaining audit logs and gathering statistics are features critical to monitoring the delivery of paid commercial messages as well as for other purposes. For example, for purposes of assessing copyright royalties, the audit logs can record the number of listeners for each musical or video selection that is distributed by the system. Another application is to determine the percentage of listeners who are interested in listening to a particular musical selection by determining how many listen to the entire selection and how many turn it off.

The system of the present invention can be considered a distribution architecture integrated with a control architecture. The distribution architecture handles scalable real-time delivery of information to any number of Users on a packet switched network, such as the Internet. The control architecture represents a second scalable system integrated with the distribution architecture for managing and administering the delivery of that information.

The remainder of this description is divided into three sections. In the next section the distribution architecture will be described in more detail. Following that, the control architecture will be described. In the third section the User interface will be illustrated.

I. Distribution Architecture

The distribution architecture provides for the delivery of real-time information to any number of Users distributed throughout a network. As will be described in detail below, the distribution architecture is scalable to allow for efficient delivery of multiple simultaneous information channels in real-time to a large number of Users.

In the preferred embodiment, the information which is being distributed consists of high-quality audio in addition to other information. It should be appreciated that the basic architecture and other general principles set forth herein would also apply to the delivery of video, graphics, text or any other type of information that can be delivered over a digital network. In addition, it should be appreciated that an information stream can consist of audio with supplemental information such as text and graphic images and commands to control software running on the User's computer.

Figure 2:
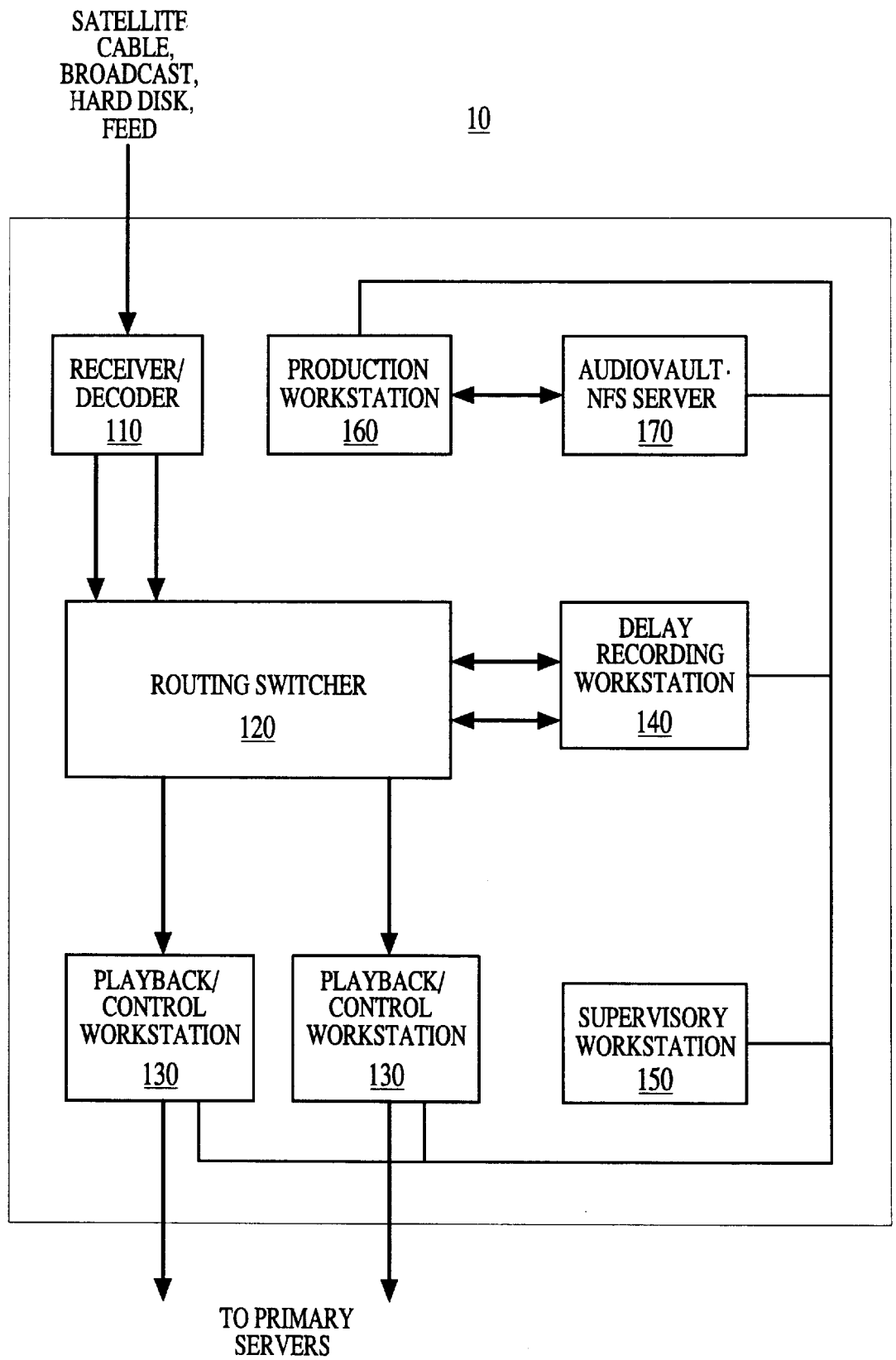
FIG. 2 is a schematic diagram depicting the network control center for the system of FIG. 1.

The source of information in the preferred embodiment is the Network Control Center 10, depicted in the schematic diagram of FIG. 2. Control Centers of this type of design are available from Broadcast Electronics, Inc. and are similar to what would be found in a conventional radio station serving multiple frequencies.

Referring to FIG. 2, the incoming signal can be received in a variety of ways such as from a satellite, over-the-air broadcast, cable or hard disk. It is then processed by Receiver/Decoder 110, which decodes the signal and provides an incoming audio stream. Routing Switcher 120 is responsible for routing the incoming audio feed from the Receiver to either Delay Recording Workstation 140 or to one of the Playback/Control Workstations 130. Real-time insertion of paid commercial advertising takes place at the Playback/Control Workstations and the resulting integrated audio stream is delivered to the Primary Servers. The Delay Recording Workstation is responsible for recording an incoming broadcast so that it can be played back at a later time.

Supervisory Workstation 150 is responsible for managing and controlling the Playback/Control Workstations, Delay Recording Workstations and other computers as may be connected to the local area network within the Network Control Center. Production Workstation 160 and AudioVAULT-NFS Server 170 are used to manipulate audio samples, such as commercial messages for use by the Playback/Control Workstations. The audio being delivered can consist of syndicated TV or radio programs, such as would be received over satellite or cable and delivered as described above. These can be delivered live and/or played back at a later time. It is also possible for the delivery of information, such as music, to take place from information that is all stored locally such as on a hard disk. A new play list and its associated music data can then be downloaded periodically to update the channel. Additionally, it is possible to deliver commercial-free programming, for example public service announcements or label-specific music.

In the preferred embodiment the Primary Servers are responsible for compressing the audio stream using an advanced perceptual technique developed and licensed by AT&T Corp. and Lucent Technologies, Inc. This highly sophisticated algorithm is used to maximize the benefit of the bandwidth available. Advantageously, two bitrates are available, a first rate of approximately 20 Kbps and a second rate of approximately 56 Kbps. Using the perceptual technique, the quality of the first rate is similar to FM monaural (with a sampling rate of approximately 22,000 16-bit samples per second) and the second rate is close to CD quality stereo (with a sampling rate of approximately 32,000 16-bit samples in stereo each second). The signals at the two different bitrates comprise two different audio channels and thus require two different compression processes.

The computational requirements of compressing an audio stream in real time using techniques such as the advanced perceptual technique are approximately 100% of a Pentium-Pro 200 Mhz computer and the computational requirements of decompressing an audio stream in real time are approximately 30% of a Pentium 75Mhz computer. Future improvements and/or changes to the algorithm could significantly change these requirements. For the present, a dedicated computer is required within the Primary Server to compress the audio stream. The decompression process takes place on end Users' computers and preferably would use only a portion of the computers' computational requirements, allowing the computers to be used for other tasks while they are processing the audio stream.

It is important to appreciate that the compression and decompression techniques employed by the present invention are not critical to the overall operation of the system and the advantages obtained therefrom could be obtained with other compression methodologies. Advantageously, the identity of the compression technique used can be encoded into the audio stream in the packet header. This makes it possible to identify to the receiver the nature of the decompression algorithm to use; and thereby make it possible for the computer within the Primary Server to select an optimum compression algorithm depending on the nature of the audio stream to be compressed.

Figure 3:
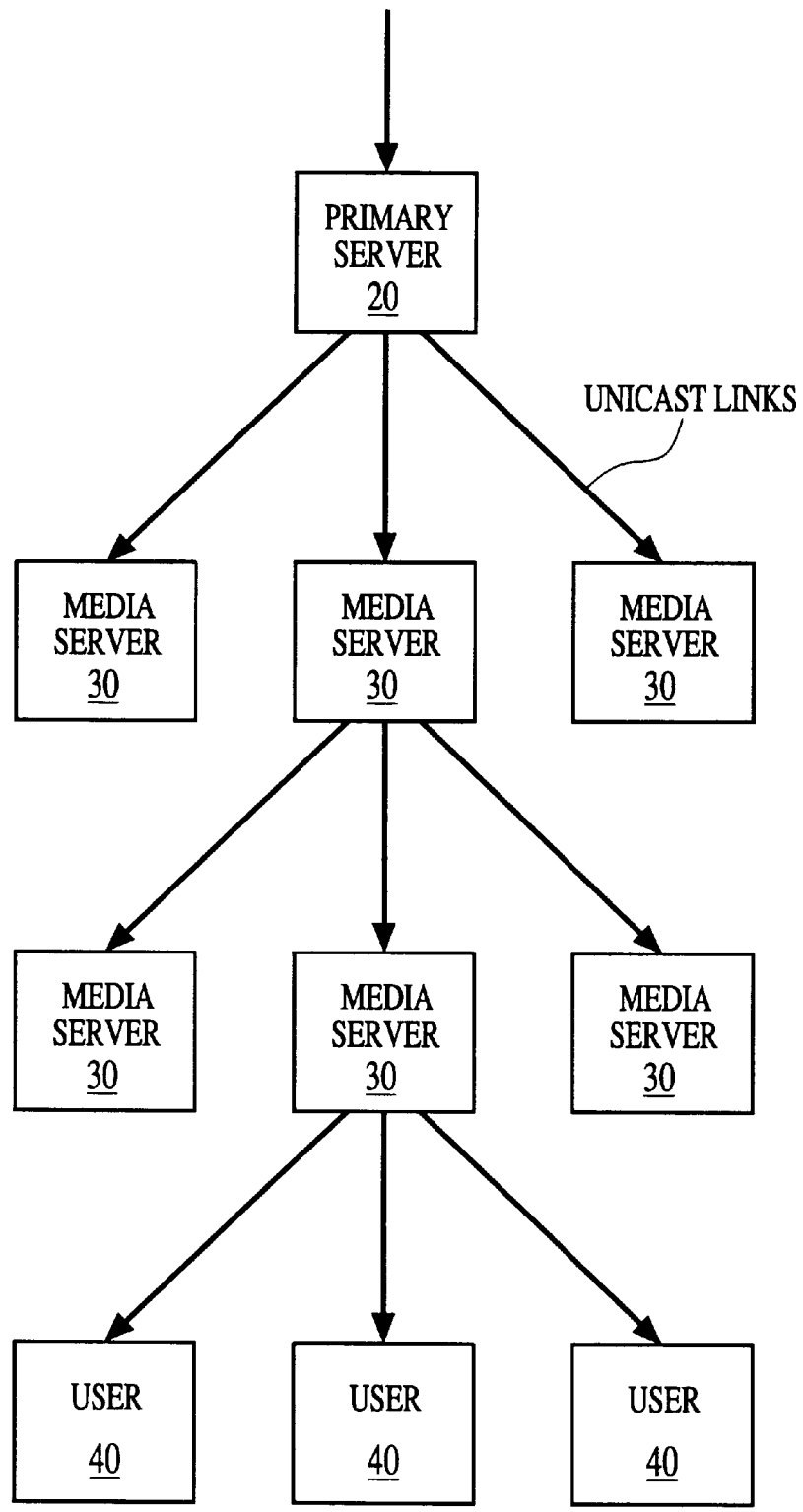
FIG. 3 is a schematic diagram depicting a unicast distribution structure.

The remainder of the distribution architecture comprises the multilevel hierarchy of data transmission originating at the Primary Server 20 and terminating at the Users 40 as shown in FIG. 3. In the preferred embodiment, the network is the global connected Internet. It can also include private networks which are connected to the Internet and it could be implemented on any packet switched network, cable-modem-based or satellite-based cable system. It is possible that certain links within the overall system, for example, the link between the Primary Server and the first level of Media Servers, are private data links which carry only data associated with this system. This could also be true of other data transmission paths in the distribution architecture. The User receiving the information preferably can be anyone who has access to the Internet with sufficient bandwidth to receive the resulting audio data.

It should be appreciated that the distribution architecture of the present invention provides for scalability. Using such a structure, any number of Users, and as widely distributed as necessary, can be accommodated. In the preferred embodiment, the fan-out at each level of Media Server (given the state of technology today) is on the order of ten, but the same structure could be applied with other fan-outs. The location and fan-out of the Media Servers is chosen to minimize overall network bandwidth consumed.

The flow of information from Primary Server 20 through network to User 40 is based on the delivery of a continuous sequence of individual pieces of information, or packets. Thus the distribution architecture implements a form of multicast packet delivery to a group. The group in this case is the set of all Users who are listening to a given channel at a given time. Group membership is dynamic, Users can start and stop listening to a channel at any time.

Multicasting can be implemented in a variety of ways, any or all of which can be used in the present invention. In the preferred embodiment, the Media Servers receive unicast packet streams and they then duplicate these streams into more unicast streams to other Media Servers which are in the membership group for that stream. The lowest level Media Servers use hardware broadcast, multicast and/or unicast to reach all Users served by that Media Server.

If the Media Server is directly connected to the same physical network as the User, hardware broadcast or multicast can be used to transmit the packet stream to all Users listening at that time on that network. In this case the Media Servers can translate the incoming packets into broadcast or multicast packets for transmission on the local network. Only a single packet is transmitted at-a-time on the local network and any computer directly connected to the local network can receive that packet. Hardware multicast is built into most networks and it is lower in overall overhead than hardware broadcast since computers not interested in a transmission do not have to process the packets. In the case that a Media Server is serving a user who is not on the same physical network, a unicast transmission is used to reach that User, which requires a separate packet transmission for each User so connected. In the preferred embodiment, the assignment of Users to Media Servers is done using control transactions among the User 40, Control Servers 50, and Administration Server 60. This system will be described more fully in the following section.

Figure 4:
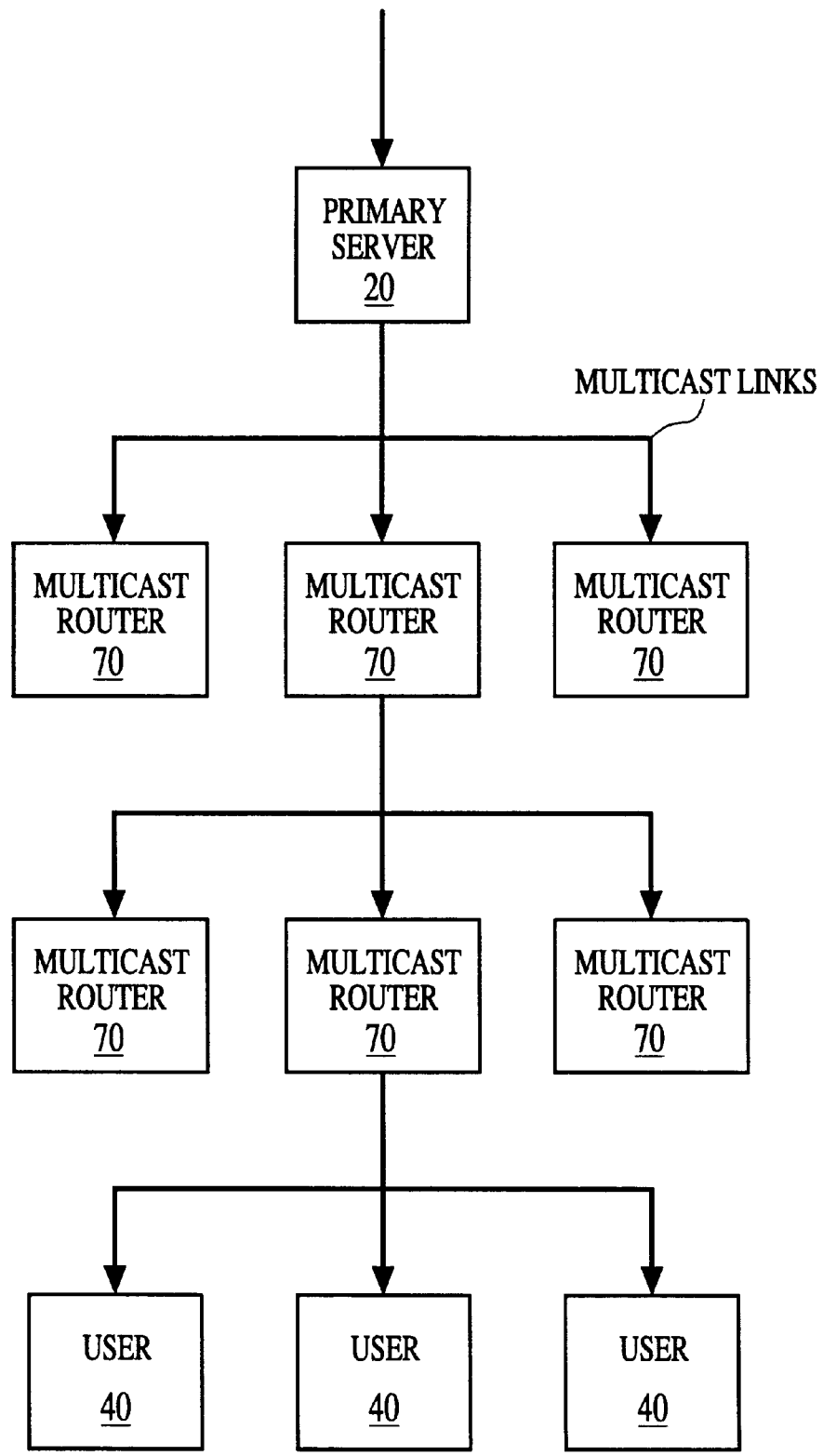
FIG. 4 is a schematic diagram depicting a multicast distribution structure.

Multicasting can also be implemented within the Internet at the IP level using IP class D addresses and the IGMP group control protocol. FIG. 4 illustrates how the multilevel hierarchical distribution architecture would operate using IP multicast delivery. Under this system, a packet is transmitted with a multicast address for a destination and each router maintains group membership lists for each interface that it is connected to and will forward packets across the Internet to other routers such that all Users within the global group eventually receive a copy of the packet. Unless and until all routers within the Internet understand multicasting in this way, it is necessary to supplement it with IP tunneling in which multicast packets are encapsulated in unicast packets and routed by unicast routers to a multicast routers. The present invention can and will be able to take advantage of IP multicasting as it becomes widely available. Each channel of information would be given its own class D address and the Media Server would then simply transmit packets using the appropriate IP destination address. In this case no Media Servers would be used as this function would be accomplished by the routers in use to store and forward other IP packets.

Thus it can be appreciated that the implementation of the multicast delivery structure can be implemented using a combination of IP unicast, IP multicast and hardware multicast or any other system which provides for distributed delivery of information to a specific group of destinations. It is expected that special relationships with Internet providers will be established so that delivery of the audio steams can take place with a guaranteed bandwidth and in the most efficient way possible.

In the preferred embodiment, packets of information for distribution use the UDP protocol under IP rather than the TCP protocol. TCP provides for reliable stream delivery but at the cost of retransmission and delays. For real-time information, it is usually more appropriate to use UDP since the information is time critical and low latency is more important that reliability. Since TCP is a point-to-point protocol, it is incompatible with IP multicasting. However, TCP could be used on the IP unicast links between Media Servers which are expected to have very low packet loss. In order to handle out of order, lost, duplicate and corrupted packets, the UDP packets are serialized.

In the preferred embodiment the size of the audio packets being transmitted is variable and can change on a packet by packet basis. It is expected that when using compression schemes that have a fixed bit rate, such as ADPCM, all packets for that stream would be the same size. Alternatively when using a variable bit rate compression algorithm, it is expected that packet size would vary so as to establish approximately the same amount of time for each sample. For example, if each packet corresponds to a 20 millisecond segment of speech, this could correspond to 100 bytes during one time period and 200 bytes during another. Additionally, the Media Server may choose to dynamically vary the packet size to accommodate changes in network conditions.

Since the resulting playback of audio information is sensitive to packet loss and network congestion, software running on the various computers which make up this system monitor the ongoing situation and adapt to it in the best possible way. This may involve using different Media Servers and/or lowering the data rate to the User. For example, similar to analog dynamic signal quality negotiation present in many analog radio receivers, the User software may request a lower bitrate until the situation is improved. Also, note that the audio information being delivered to the User is preferably interleaved so that a contiguous segment of the audiostream is distributed for transmission over several packets. As a result, the loss of one packet is spread out over multiple audio samples and causes minimal degradation in audio. Advantageously, a small degree of redundancy may be incorporated within the audio stream to further guard against packet loss.

Preferably, there are two bitrate options available to the User for audio delivery. These are approximately 20 Kbps for standard audio and approximately 56 Kbps for high quality audio. Thus, a 28.8 Kbps modem connection over an analog phone line is sufficient to listen to standard audio broadcasts. To listen to high quality audio, an ISDN connection to the Internet is required, or some other connection with greater than 56 Kbps bandwidth. It should be appreciated that higher bandwidths are currently becoming available to end Users. In particular the use of cable modems and residential fiber networks are enhancing the bandwidths available to Users and thus making broadcasts of higher bitrates more practical.

In addition to the content of the audio channel being delivered, it is also possible to deliver out of band of side-bar information such as graphics, images and text. This side-bar information is synchronized with the audio channel. This may only involve small increases in bandwidth requirements, such as 1–2 Kbps. For example a music program could deliver images of an album cover, the text of song lyrics, or URLs for use by a Web browser. The User can preferably choose to have the side-bar information show up automatically or be hidden. It is also possible to incorporate two-way interaction into the system, such that for example Users can participate in a global chat session during the audio broadcast. These and other details are explained in more detail below under the description of the User interface.

Figure 5:
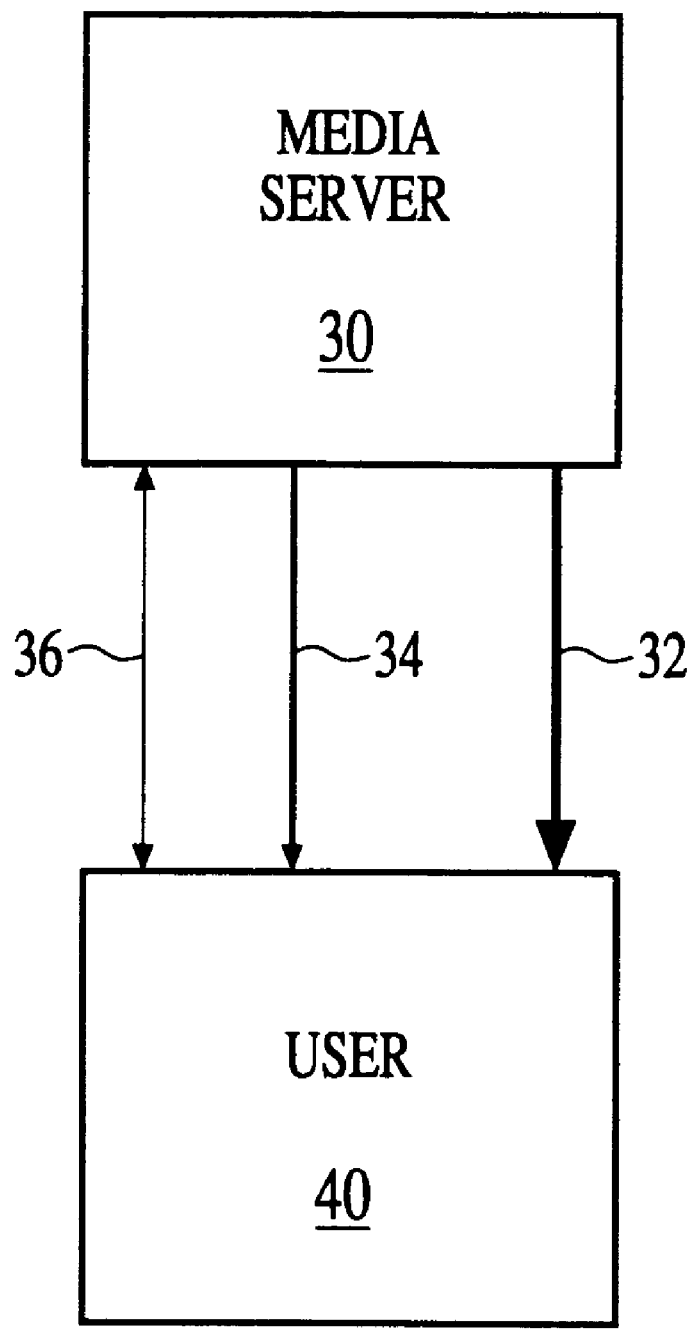
FIG. 5 is a schematic diagram depicting the connection between the media server and the user in the system of FIG. 1.

The delivery of paid commercial advertising information is an important aspect of the present invention. Advertising may be incorporated into the audio stream within the Network Control Center as described above. It may also be incorporated into the audio stream at the User level, or at some intermediate point in the distribution architecture. In addition, the side-bar information discussed above can also include advertising content. FIG. 5 illustrates the provision to the User of two separate streams 32, 34 of packets, one of which may be used for advertising. In this case the insertion of the stream of commercial advertising into the non-commercial stream occurs on the User's computer. FIG. 5 also illustrates packet stream 36 which identifies the User to the system. This enables the system to monitor which Users are listening to which channels and also allows the system to vary, for example, the advertising content delivered to a User.

One advantage of this alternative is to allow targeted commercial delivery based on the individual User. That is, an individual User would receive the main audio feed plus a particular advertising stream unique to his demographic group. Note that the advertising stream typically is lower in overall bitrate and generally does not require real-time delivery, thus lowering the overall load on the network. For example, the advertising stream could be delivered to the User in advance of the regular programming, stored in a buffer in the User's computer and inserted into the stream of regular programming upon receipt of a cueing signal embedded in the stream of regular programming. Thus, a substantial number of targeted groups, perhaps 10 or 100 or even more could be accommodated without an impractical increase in network load.

II. Control Architecture

The control architecture described in this section is responsible for managing and administering the Users who are receiving the information being delivered by the distribution architecture described in the previous section. The control architecture handles new User registration, User login, the starting and stopping of audio streams and the monitoring of ongoing transmissions. The control architecture is scalable just as is the distribution architecture so that any number of Users can be managed.

This section describes the control protocol, which consists of the format and sequence of control messages that are exchanged among Users, Control Servers, Media Servers, Primary Servers and the Administration Server. These messages are in the form of objects, which have specific data formats. Objects are exchanged preferably using the TCP protocol although other options are possible. Below we describe the sequence of objects passed among the various computers and detail the internal structure of each object.

The major objects used in the present embodiment of the invention are set forth in Table 1. For each object, Table 1 provides a brief description of its function, identification of the names of the fields in the object, their types and a brief description of their function.

TABLE 1

| Field Name | Field Type | Remarks |
|---|---|---|
| | Channel Activation Object | |
| | Contains information used for channel activation/deactivation. | |
| | It is sent to Media and Primary Servers to tell them to carry | |
| | or stop carrying a specific channel. Media Servers get the channel | |
| | from another server in the system hierarchy and Primary Servers | |
| | get and encode the feed from the actual input source. | |
| Token | Security Token Object | |

TABLE 1-continued

| Field Name | Field Type | Remarks |
|---|---|---|
| Moniker | Moniker Object | unique channel identifier |
| Activate | Int | action flag (activate/deactivate) |
| CompressType | Int | type of compression to use |
| Host | Host Object | host carrying the channel |

Channel Guide Object
Contains analytical and descriptive information for an item requested that is uniquely identified by a moniker. It is usually the reply to a Channel Guide Request object.

| Field Name | Field Type | Remarks |
|---|---|---|
| Token | Security Token Object | |
| Type | Int | type of content |
| Result | | the content data itself |

Channel Guide Request Object
Conveys a request for analytical and descriptive information about an item uniquely identified by the contained moniker. The reply is in the form of a Channel Guide object.

| Field Name | Field Type | Remarks |
|---|---|---|
| Token | Security Token Object | inherited from base class |
| Type | Int | type of content |
| Moniker | Moniker Object | unique identifier |

Host Object
Encapsulates the attributes of a networked computer related to the operation or services it offers or requests.

| Field Name | Field Type | Remarks |
|---|---|---|
| Token | Security Token Object | |
| Host name | String | computer name and domain |
| PortNumber | Int | port number for service |
| DisplayName | String | descriptive computer name |

Login Information Object
Encapsulates the name and password by which a User is known to the system.

| Field Name | Field Type | Remarks |
|---|---|---|
| Token | Security Token Object | |
| Login | String | User's system login name |
| Password | String | User's system password (possibly encrypted) |

Media Control Interface (MCI) Request Object
Encapsulates a multimedia control command, such as play and stop, and any extra information that may be necessary to perform the requested service.

| Field Name | Field Type | Remarks |
|---|---|---|
| Token | Security Token Object | |
| Command | Int | multimedia command |
| String | String | command-specific extra info |

Moniker Object
A moniker encapsulates the name of an object or process with the intelligence necessary to work with that name. In other words, it provides naming and binding services. The Moniker Object is used in the system for unique identification of various components, parts or features, such as a channel, a directory, or a computer list.

| Field Name | Field Type | Remarks |
|---|---|---|
| Token | Security Token Object | |
| ID | String | unique string identifier |
| DisplayName | String | User-readable name |

Ping Object
Ping is the name given to the "Are-You-Alive?" operation useful in determining if a specific computer is up and running. This object is used in the system when a server has to be queried for its operational status. It can also provide tuning information for statistical purposes and quality of service evaluations.

| Field Name | Field Type | Remarks |
|---|---|---|
| Token | Security Token Object | |
| Date | Date | system date |
| Time | Time | system time |

Protocol List Object
Encapsulates a general purpose collection object.

| Field Name | Field Type | Remarks |
|---|---|---|
| Token | Security Token Object | |
| Type | Int | type of object list |

Result Message Object
Acts as the acknowledgment for a requested service successfully carried that out or reports errors that occur in the system during a client/server transaction.

| Field Name | Field Type | Remarks |
|---|---|---|
| Token | Security Token Object | |
| Code | Int | result code |
| Message | String | message corresponding to code |

Security Token Object
Contains the authorization key for a transaction. The key must be validated before any service is performed.

| Field Name | Field Type | Remarks |
|---|---|---|
| ID | String | authorization key/transaction ID. |

Server Activation Object
Contains information used in the server activation/deactivation process. Used for announcement as well as command purposes (e.g., a server can notify the administration database that is now activated or a server can be instructed to manage someone else).

| Field Name | Field Type | Remarks |
|---|---|---|
| Token | Security Token Object | |
| Active | Int | action flag (activate/deactivate) |
| Manage | Int | control flag (manage/associate) |
| Type | Int | server type |
| Host | Host Object | host to be controlled |

Server List Request Object
Encapsulates a request for a list of available server resources for an identified service (e.g., a request for a list of Control Servers for a specified channel).

| Field Name | Field Type | Remarks |
|---|---|---|
| Token | Security Token Object | |
| Type | Int | type of service |
| Moniker | Moniker Object | content/channel unique identifier |
| Host | Host Object | local host information |

Statistics Object
Contains system-related information that can be used by load-balancing algorithms and for statistical purposes.

| Field Name | Field Type | Remarks |
|---|---|---|
| Token | Security Token Object | |
| Load | Int | Load on the system |
| Threads | Int | number of threads remaining |
| Users | Int | number of Users being serviced |
| Uptime | Int | amount of time running |
| NumberManaged | Int | number of managed servers |
| NumberAssociated | Int | number of associated servers |

Statistics Request Object
Encapsulates a request for system-related information that can be used by load-balancing algorithms and statistical purposes.

| Field Name | Field Type | Remarks |
|---|---|---|
| Token | Security Token Object | |
| Load | Int | request flag (on/off) |
| Threads | Int | request flag (on/off) |
| Users | Int | request flag (on/off) |
| Uptime | Int | request flag (on/off) |
| NumberManaged | Int | request flag (on/off) |
| NumberAssociated | Int | request flag (on/off) |

TABLE 1-continued

| Field Name | Field Type | Remarks |
|---|---|---|
| User Object |||
| Users and Servers use this object to register themselves with the administration database. They provide the information for subsequent logins (name, password) and other system-related info. The end-Users provide personal, demographic, and system-related information. |||
| Token | Security Token Object | |
| Login | Login Information Object | login information(name, password) |
| FirstName | String | User's first name |
| LastName | String | User's last name |
| Title | String | User's job title |
| Company | String | User's employer |
| Address1 | String | User's home street address |
| Address2 | String | User's address extra |
| City | String | city, village |
| State | String | state, province or foreign country |
| ZipCode | String | zip or postal code |
| Age | String | User's age |
| Gender | String | User's gender |
| PhoneNumber | String | telephone number |
| FaxNumber | String | fax number |
| Email | String | email address |
| Demographics | Dictionary | market-targeting extra User info |
| SystemInfo | Dictionary | system-related information |
| Version Object |||
| All components of the system use this object to report their versioning information to the party they transact with in order to use a protocol they both understand. They are also given the chance to update themselves if a newer version exists. |||
| Token | Security Token Object | |
| Major | Int | major protocol version number |
| Minor | Int | minor protocol version number |
| Type | Int | sender type |
| Client | Version | client version information |

Unlike traditional protocols based on state computers, the control protocol of the present invention is a light-weight, stateless protocol comprising simple sequences of objects. It is light-weight in that in most sequences only two objects are involved in the transaction and after a sequence is completed the connection can be reused. It is also stateless in that the server maintains no information about the client. Every transaction is handled independently of the previous ones. States exist in the lower levels, for example within the TCP layer, to express logical states of a network connection but they are not actually part of the control protocol.

In the preferred embodiment, the software-running on the Control Servers, Media Servers and Primary Servers is programmed for Windows NT and UNIX environment using the OLE environment. In addition, COM interfaces are used between components. The Rogue Wave system is used to transfer objects between the applications running on the various computers. The software running on the User computer is preferably programmed for a Windows 32-bit environment, so it will run on a Windows 95 or Windows NT computer. Alternatively, Macintosh and UNIX environments can be accommodated by other User software.

The basic process of a control transaction consists of a version sequence followed by one or more protocol sequences. The version sequence starts after the computer initiating the transaction, the client, has established a connection with the computer completing the transaction, the server. The client sends a Version Object (defined in Table 1) and in response the server then sends back its own Version Object. This version sequence is used so that both client and server are aware of the version numbers of the software they are using. If a version number is older than expected, either client or server can choose to conform to the previous version or abort the transaction, depending on its needs and capabilities. If a version number is newer than expected, in most cases the current transaction can be completed since the software systems are designed to be fully backward compatible with previous versions. Additionally, in the case that the server of the transaction is the Administration Server, the client receives information about what the latest version number is and thus the client can be informed that a software update is needed. The process of handling automatic updating of User software is described more fully below.

After the version sequence, one or more protocol sequences occur in which other objects are exchanged between client and server. When a particular protocol sequence is completed, another independent protocol sequence can be serviced. The protocol sequences that are part of the control architecture of the present invention are summarized in Table 2 and described below in conjunction with FIGS. 6–17.

TABLE 2

Summary of Protocol Sequences

| Control Sequence | Client | Server | Main Objects Exchanged |
|---|---|---|---|
| User Registration and Login (see FIG. 6) | User | Administration | Version Object User Object Channel Guide Object |
| User Login (see FIG. 7) | User | Administration | Version Object Login Information Object Channel Guide Object |
| Channel Play (see FIGS. 8a, 8B, 8C) | User | Administration | Version Object Server List Object |
| | | Control | Version Object Server List Object |
| | | Media | Version Object MCI Objects - OPEN/PLAY/ STOP/CLOSE Ping Objects (TCP connection stays open) |
| Token Validation (see FIGS. 9A, 9B) | Control or Media or Primary | Administration or Control | Version Object Security Token Object |
| Server Registration and Login (see FIG. 10) | Media or Control | Administration | Version Object User Object Server Activation Object |
| Server Login (see FIG. 11) | Media or Control | Administration | Version Object Login Object Server Activation Object |
| Control Server Activation (see FIG. 12) | Administration | Control | Version Object Server Activation Object |
| Media Server Activation (see FIG. 13) | Control | Media | Version Object Server Activation Object Ping Objects (TCP connection stays open) |
| Control Channel Activation (see FIG. 14) | Administration | Control | Version Object Channel Activation Object |
| Media Channel | Control | Media | (open TCP |

TABLE 2-continued

Summary of Protocol Sequences

| Control Sequence | Client | Server | Main Objects Exchanged |
|---|---|---|---|
| Activation (see FIG. 15) | | | connection) Channel Activation Objects |
| Distribution Activation (see FIG. 16) | Media | Media or Primary | Version Object MCI Objects - OPEN/PLAY/ STOP/CLOSE Ping Objects (TCP connection stays open) |
| Statistics Request (see FIG. 17) | Administration | Control or Media | Version Object Statistics Object |

The User registration and login sequences are the processes by which a new User registers with the system, logs in and retrieves programming information. The channel play sequence takes place when a User asks to listen to a particular channel. The token validation sequence is used to verify that a computer requesting a service is authorized to do so. The Server registration, login and activation sequences are used by Control and Media Servers when they become active. The Control Server and Media Server activation sequences are used to manage the Control and Media Servers. The control channel, media channel and distribution activation sequences are used to cause a channel to be distributed to a Media Server. Finally, the statistics request is used for administrative purposes.

Figure 6:
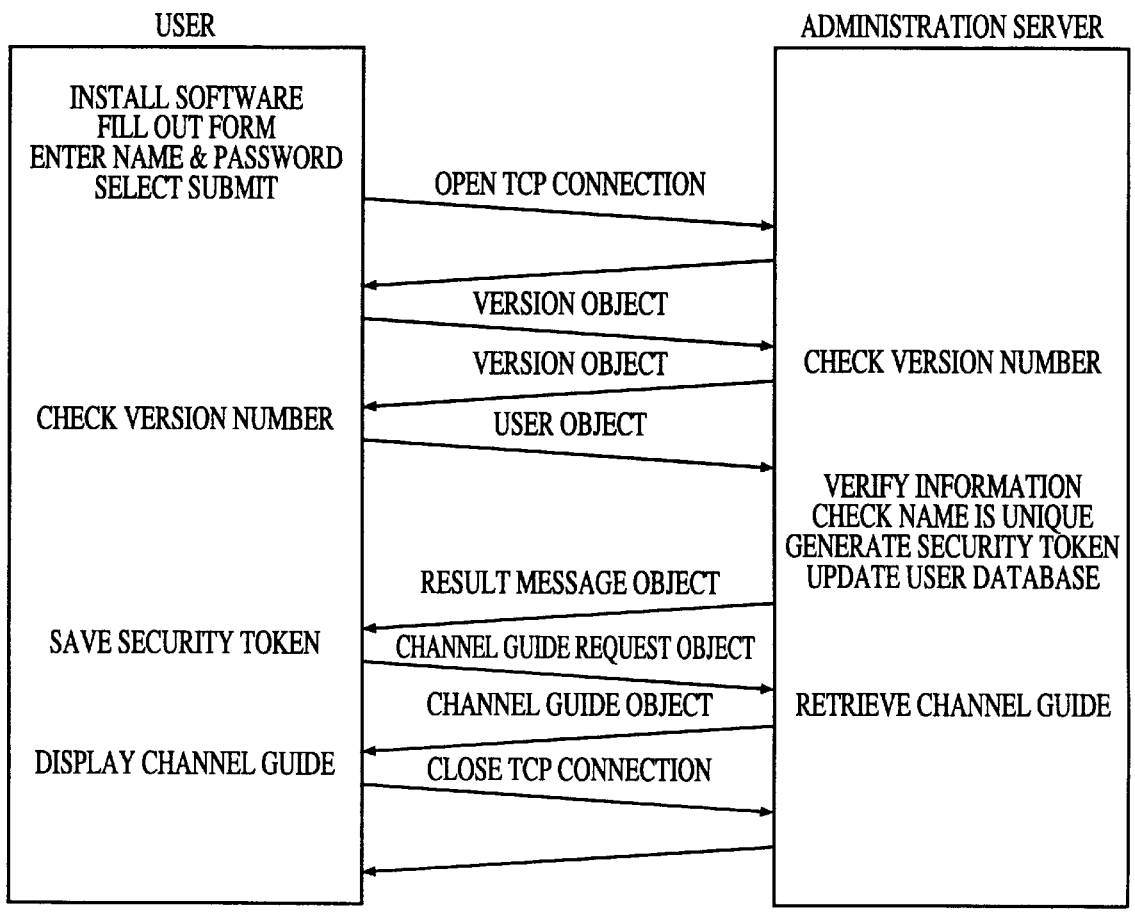
FIGS. 6–17 are timing diagrams which depict various aspects of the operation of the system of FIG. 1.
Figure 7:
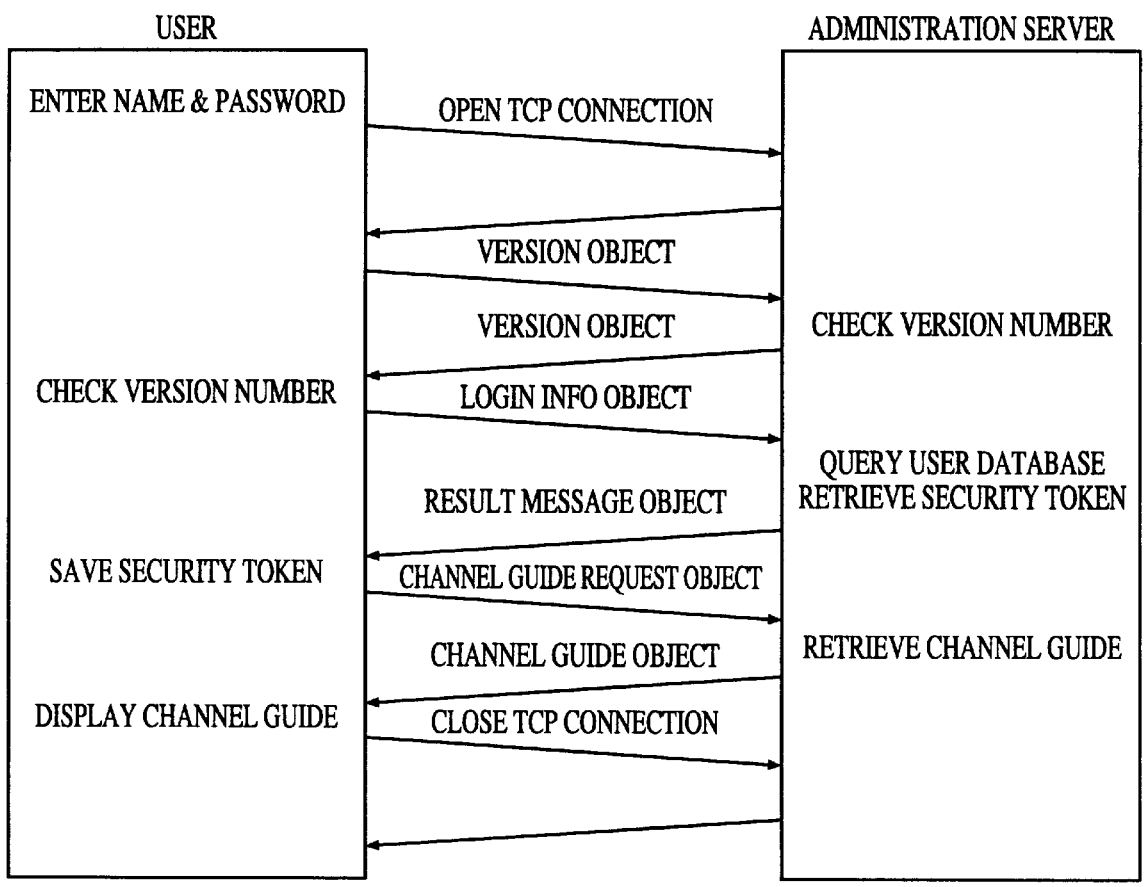

FIG. 6 illustrates the User registration and login sequence in more detail. This sequence takes place after the User has installed the User software on his/her computer. It is expected that the User will download the software from the Internet and then invoke it which in the preferred embodiment will use the Windows Wizard interface. This will guide the User through the installation process including filling out the registration form, which we will describe more fully in the next section. After the User has selected a name and password and selected the option to register, the User computer opens a TCP connection to the Administration Server. Advantageously, the full domain name of the Administration Server is embedded into the User software, although it could be discovered in other ways. The User and Administration Server then exchange version objects with the Administration Server as described above. If the version numbers meet expectations, the User sends a User Object to the Administration Server. The format of the User Object is shown in Table 1. Once the Administration Server receives the User Object, it verifies that the information is filled in properly and that the selected User name is unique. If the User Object is invalid for any reason, the Administration Server returns a Result Message Object with a code indicating the reason. The format of the Result Message Object is shown in Table 1. If the User information is valid, the Administration Server updates the global database of User names and passwords and then generates a security token for that User. This security token is then returned to the User in a Result Message Object.

Upon receiving the Result Message Object, the User saves the security token for future use. This token is an identifier that allows the User to request services from the Administration Server and other computers within the overall system. The security token is not saved permanently or registered on the User computer. Normally, the User software then immediately sends a Channel Guide Request Object to the Administration Server and a Channel Guide Object is returned. The format of these objects is also shown in Table 1. Note that in principle, this is a separate transaction and could take place in a separate TCP connection to the Administration Server. In particular, once the User has registered and logged in, he/she can request the Channel Guide Object again since it may have been updated since the previous request. At this point the TCP connection to the Administration server is closed.

The process of User registration only needs to take place once for each User. However anyone can re-register at any time, even after the software has been installed. In particular, it is expected that if multiple persons use a computer, each person will register and obtain his/her own User name and password. If the registration process is not completed successfully, the User software saves the registration information and ask the User if they would like to try again the next time the software is invoked. Since the security token is not permanently saved by the User software, it is lost when the User software is closed, and the security token must again be retrieved from the Administration Server the next time the User wants to use the system. This process is the purpose of the login sequence illustrated in FIG. 7. This sequence is used if a User has already registered and needs only to retrieve a valid security token. In this case the sequence consists of the User's sending a Login Information Object to the Administration Server. The Administration Server then queries the User database to validate the login name and password. If the login name and password are correct, then a security token is returned to the User. Normally the receipt of the security token will immediately be followed by a channel information request sequence, just as in the registration sequence described previously.

Figure 8A:
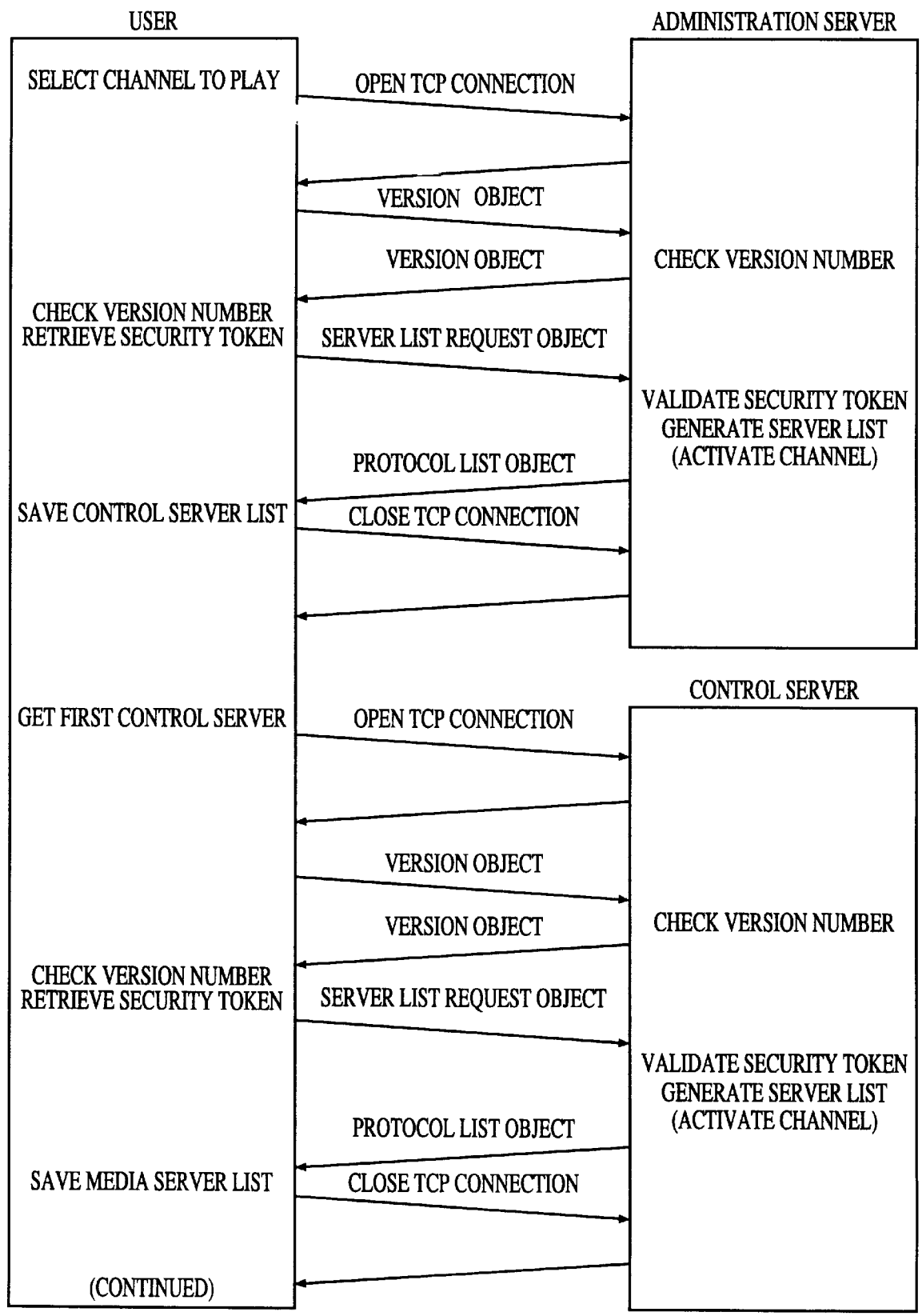
Figure 8B:
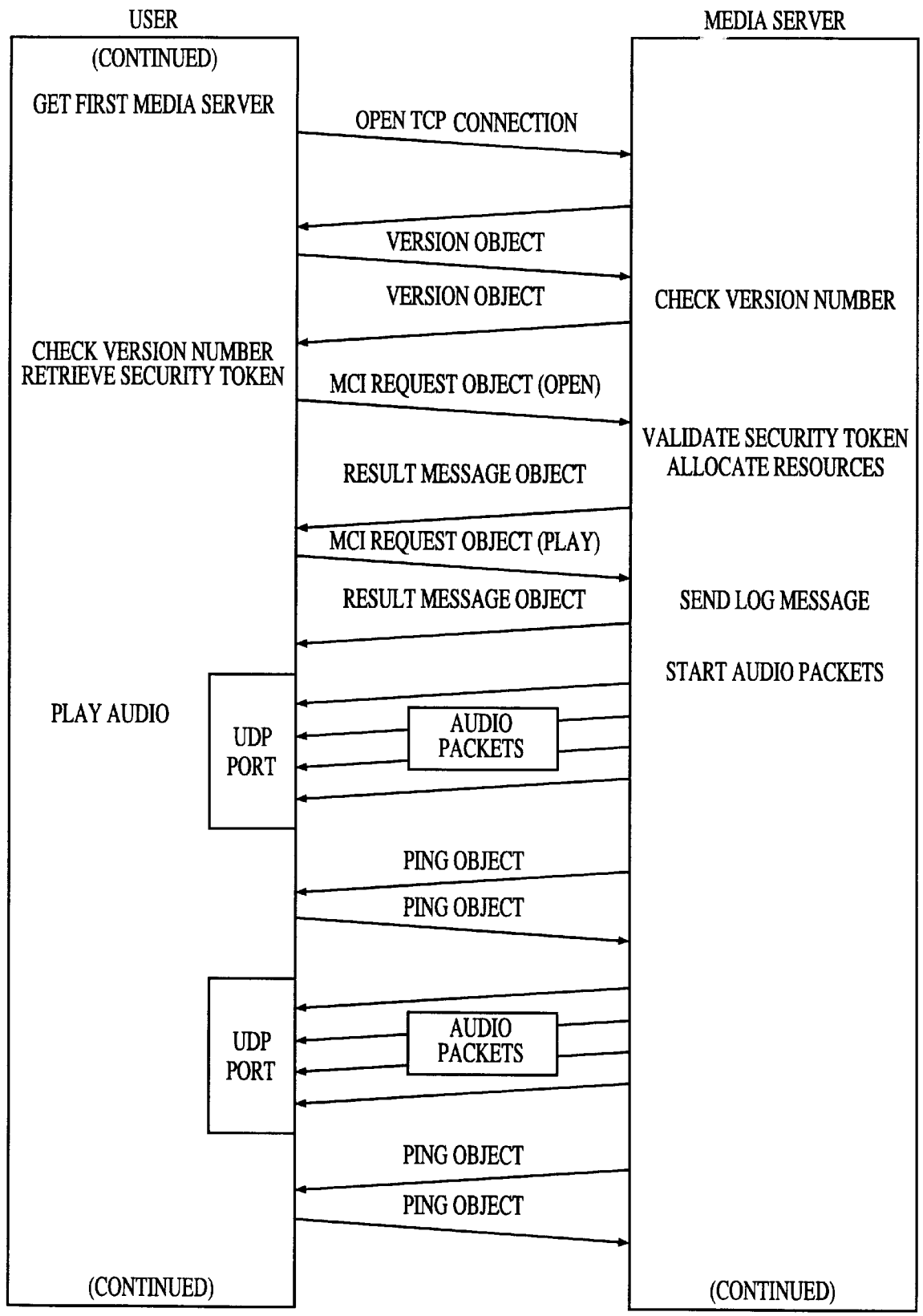
Figure 8C:
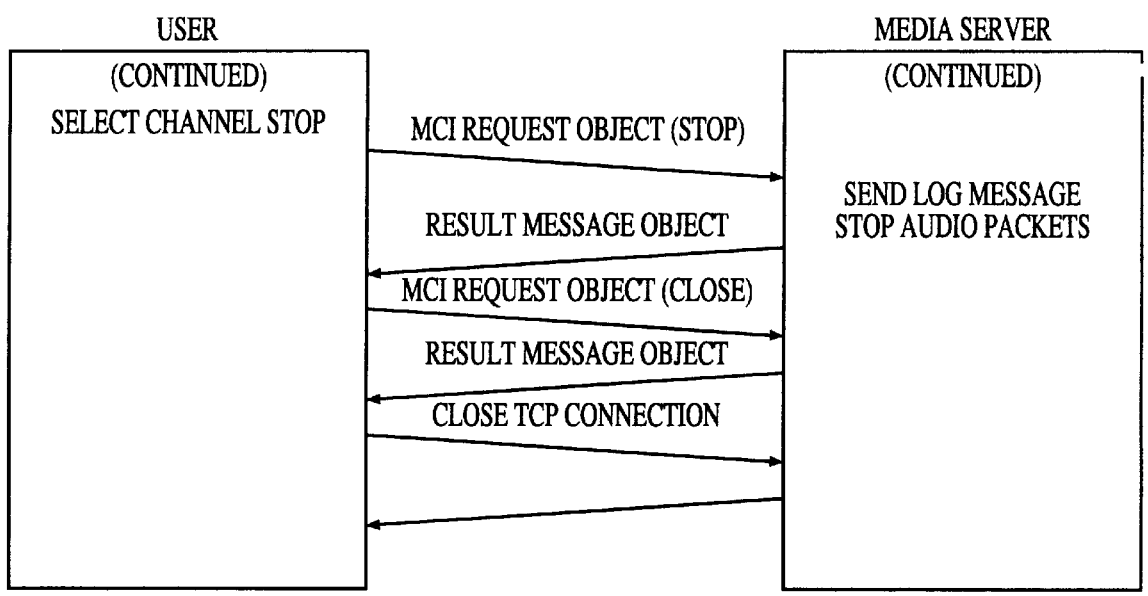

The control sequence that takes place when a User initiates a channel play operation is illustrated in FIGS. 8A, 8B and 8C. First the User software requests a Control Server List from the Administration Server. Note that the Server List Request Object, illustrated in Table 1 contains a channel identifier. The Administration Server generates a sorted list of Control Servers based on overall system load and the location of the User on the network and returns this list to the User using a Protocol List Object. Once the Control Server List is returned to the User, the Administration Server is no longer needed and the TCP connection is closed.

The User software then searches the list of Control Servers and opens a TCP connection to the first host listed. If that host computer does not respond, then the next Control Server on the list is tested and so forth in succession. Upon obtaining a response from a Control Server, the User software uses a Server List Request Object to requests a Media Server List from the Control Server. If the Control Server is too busy to service the User, it returns a Result Message Object so indicating and the User software tries the next Control Server on the list. However, in the likely scenario that the Control Server is able to handle the User's request, a sorted list of Media Servers is generated and returned to the User computer using a Protocol List Object. The TCP connection to the Control Server is then closed by the User software.

At this point the User software initiates a TCP connection to the first Media Server on the list provided by the Control Server. As in the previous case, it attempts to connect to the first host on the list and if unsuccessful tries the next hosts in succession. Once the Version Objects are exchanged, the User software sends an MCI Request Object to the Media Server. An MCI Request Object can be used for four basic commands: OPEN, PLAY, STOP and CLOSE. The User software must first send an OPEN command for the desired channel. If the returned Result Message Object indicates success, the User software then sends a PLAY command.

When the Media Server receives a valid PLAY command, it initiates the delivery of audio information to the User as described in the previous section. Note that this could be in the form of broadcast, multicast or unicast packets to a specific UDP port. The TCP connection through which the MCI Request Objects were sent stays open during the audio play operation. In addition, Ping Objects are sent to the User on a periodic basis to verify that the computer is still working and active. When the User software receives a Ping Object, it simply returns it. The Media Server uses the Ping Objects to measure round trip time and also to determine when a User's computer has terminated abnormally. In that case the audio stream is terminated.

In the case of normal termination of the audio stream, the User makes an explicit selection to stop and this causes a STOP command to be sent to the Media Server in an MCI Request Object. The Media Server then terminates the audio stream to that User. When the User closes the application software or selects another channel to play, the User software will send a CLOSE command to the Media Server in an MCI Request Object and the TCP connection is closed.

The initiation of the audio stream by the Media Server causes a log entry to be generated and sent to the Administration Server. This information is important so that the Administration Server can update its database to indicate which Users are listening to which channels. The security token is used to identify the User initiating the audio stream. Additionally, when the audio stream is terminated to any User, another log message is generated and sent to the Administration Server.

Figure 9A:
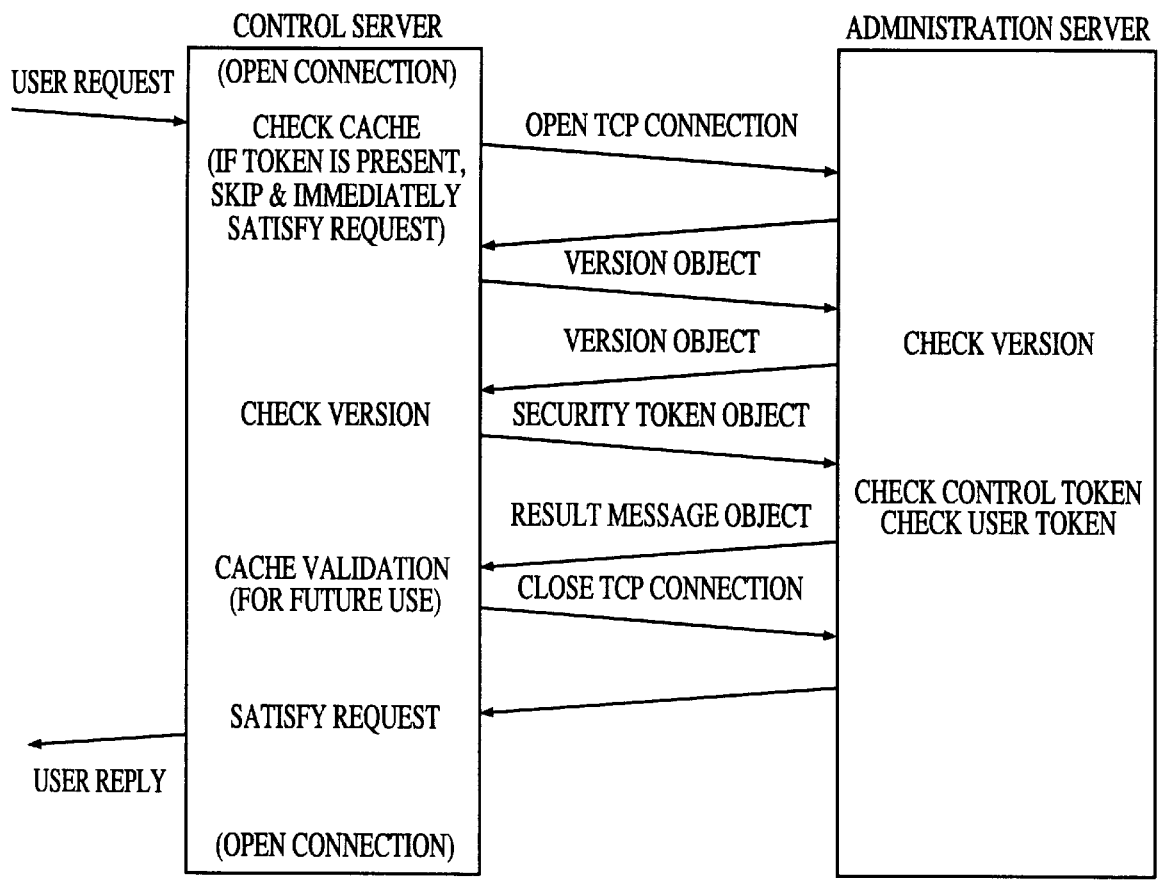

FIG. 9A illustrates the process by which security tokens are validated. The Administration Server is the only server that can validate a security token. Thus, when a User requests services from a Control Server or from a Media Server, that server must go back to the Administration Server with a token validation sequence. However, Control Servers and Media Servers are allowed to cache validations of security tokens so that they do not have to validate tokens repeatedly once they have validated it the first time. In the case where a Media Server receives a request, the token will be validated with the Control Server that is managing that Media Server. FIG. 9B identifies the various token validation scenarios.

Figure 10:
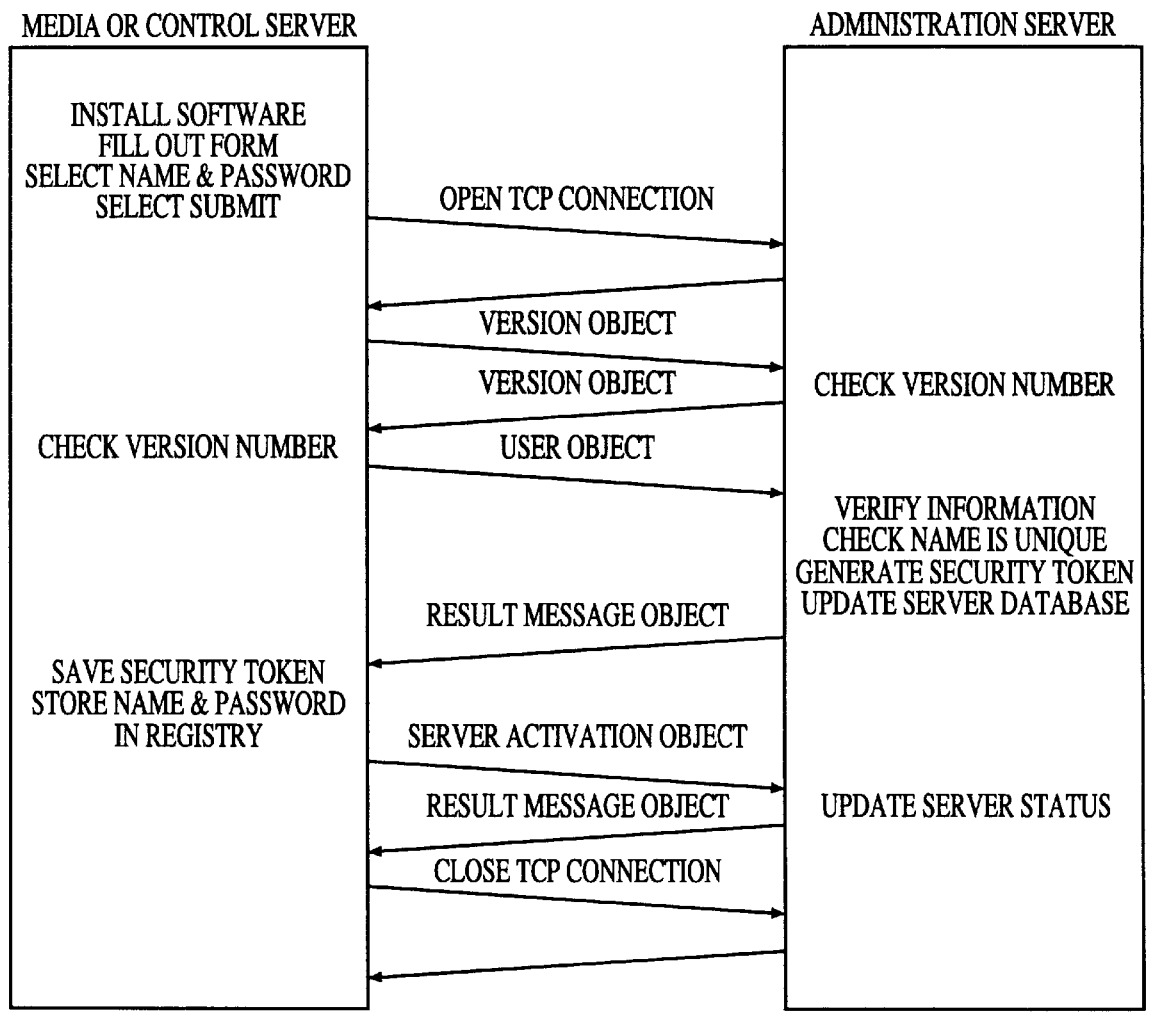
Figure 11:
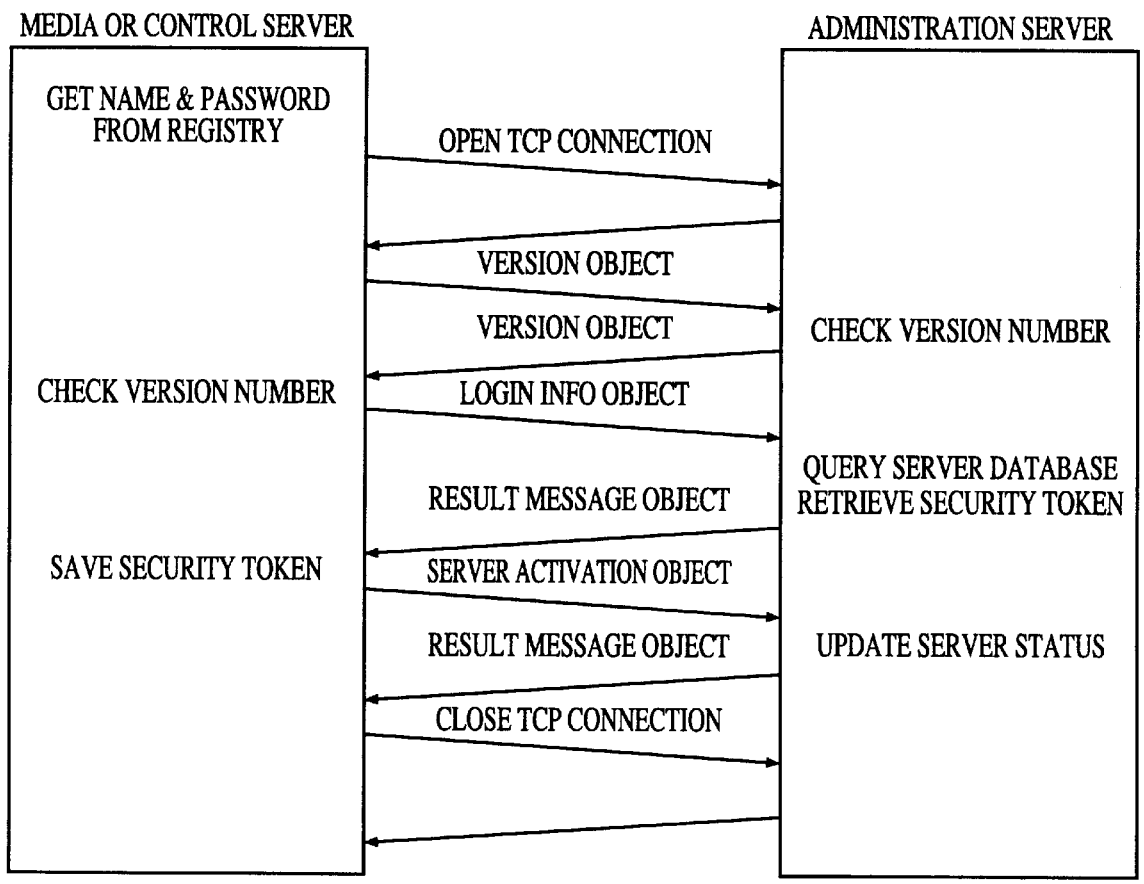

FIG. 10 illustrates the process by which a new Server is registered. This process is similar to new User registration. It is expected, however, that the server installation will be through a Web interface rather than a Wizard. The Administration Server, upon receiving a User Object from a Media Server or Control Server validates the User name and password and generate a security token just as in the case of User registration. Normally the Server then immediately sends back a Server Activation Object indicating that it is ready to be used as a system resource. Once this process has been completed, the TCP connection to the Administration Server is closed.

If a Media Server or Control Server that has sent a Server Activation Object to the Administration Server becomes inactive, it will send another Server Activation Object indicating this condition. In the case of a Media Server, this object is sent to the managing Control Server. In the case of a Control Server, this object sent to the Administration Server. As in the case of User registration, Media Server and Control Server registration needs only take place once per computer. However, if the computer is restarted, the server must login and again retrieve a security token. This is the server login and activation sequence shown in FIG. 11.

Figure 12:
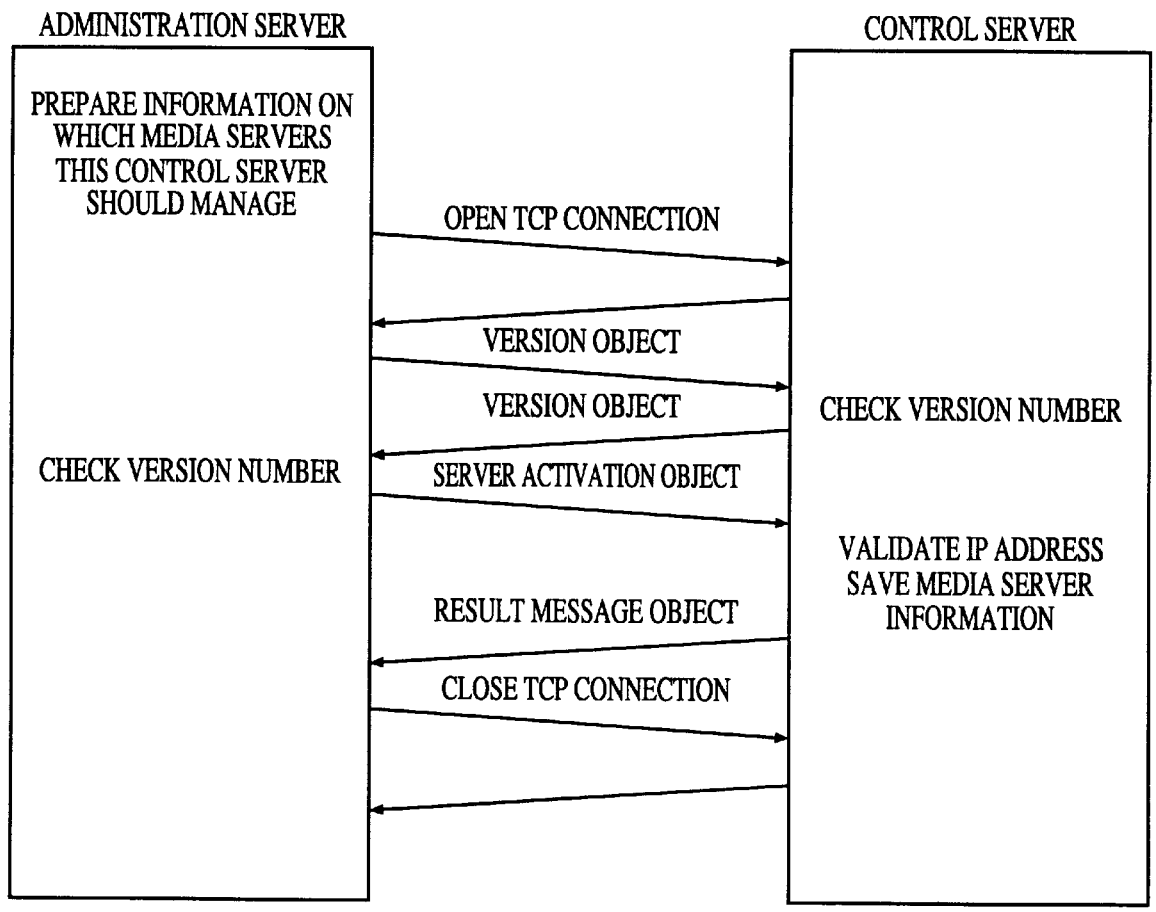

Once a Control Server has indicated to the Administration Server that it is ready, the Administration Server can activate that Control Server by sending the Control Server a Server Activation Object as illustrated in FIG. 12. This is a separate transaction and is used to tell the Control Server which Media Servers it is supposed to manage. Recall that a Control Server and a number of Media Servers form a cluster of Media Servers. The single Control Server that manages that cluster must be given a list of host computers corresponding to the Media Servers in that cluster.

Figure 13:
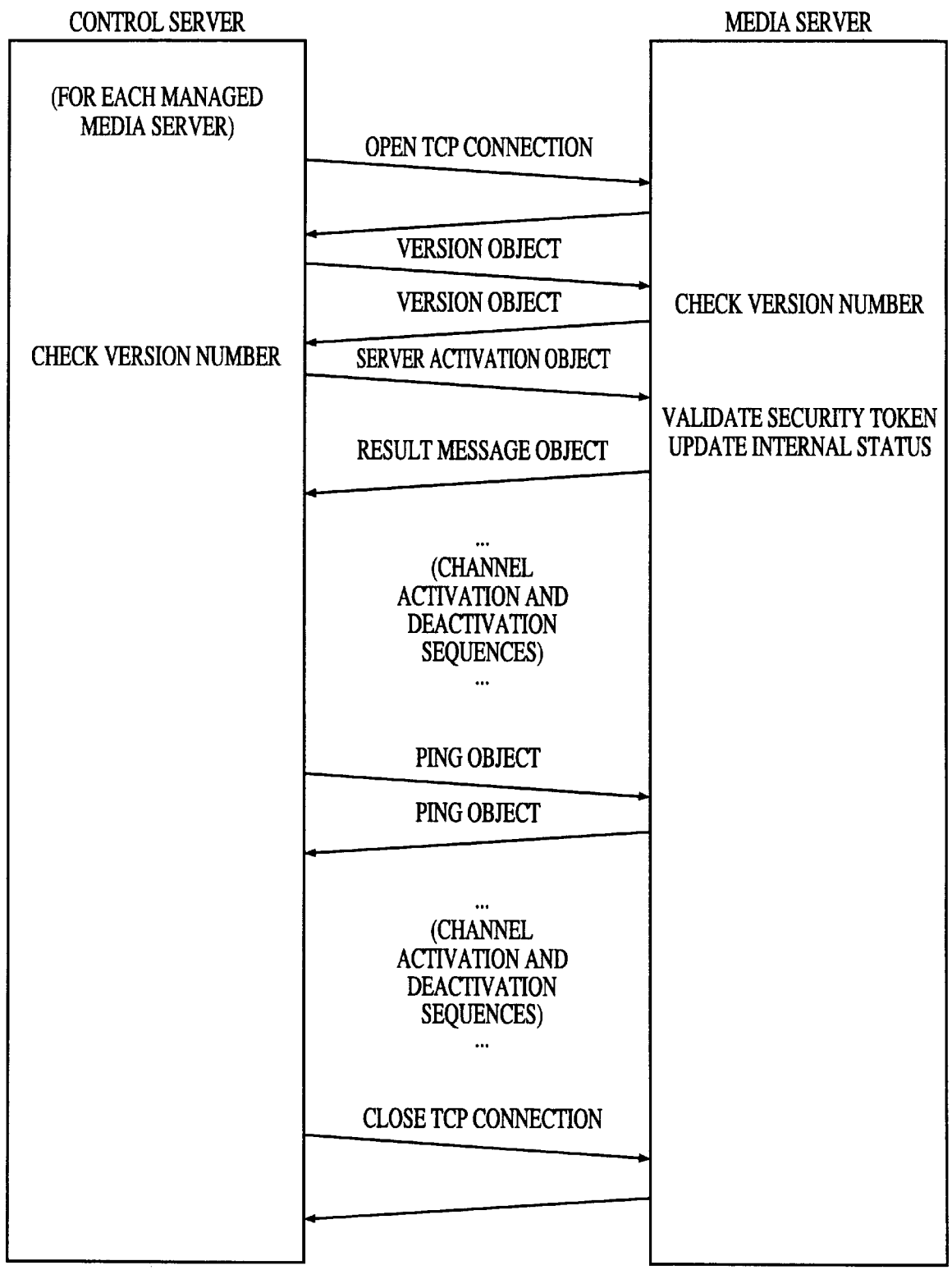

The process by which a Control Server activates the Media Servers that it manages is illustrated in FIG. 13. The Control Server sends a Server Activation Object to the Media Server indicating that it is responsible for channel management. This TCP connection between the Control Server and the Media Server stays open during the time that both servers are active. The Control Server periodically sends Ping Objects to the Media Server across this open TCP connection to verify that the Media Server is still running.

Figure 14:
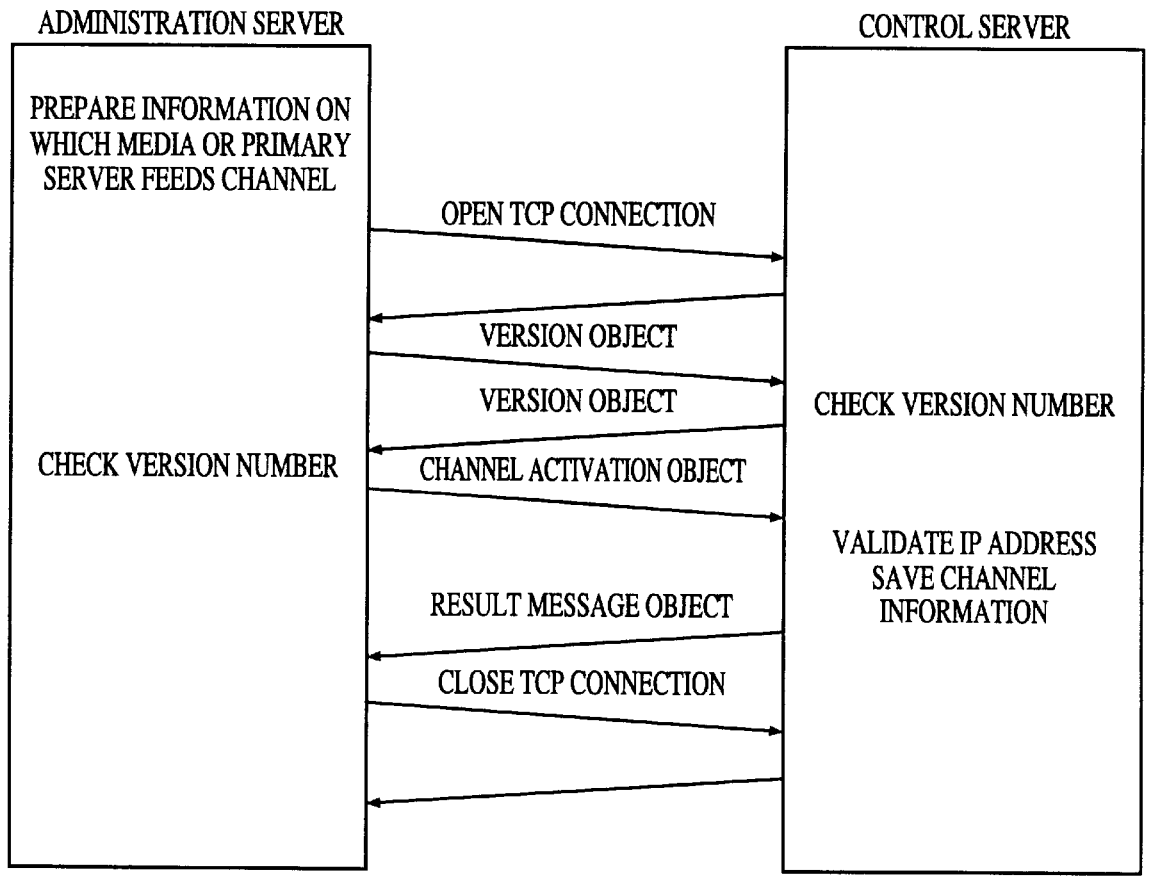

FIG. 14 illustrates the process by which a given channel is activated by the Administration Server. The Administration Server opens a connection to a Control Server that its wishes to have carry a given channel and provide a Channel Activation Object. This object indicates to the Control Server which Media or Primary Server the Control Server should direct its Media Servers to get the feed from. At this point the Control Server is said to be carrying that channel and it will be a valid host on a list of Control Servers requested by a Channel Play sequence.

Figure 15:
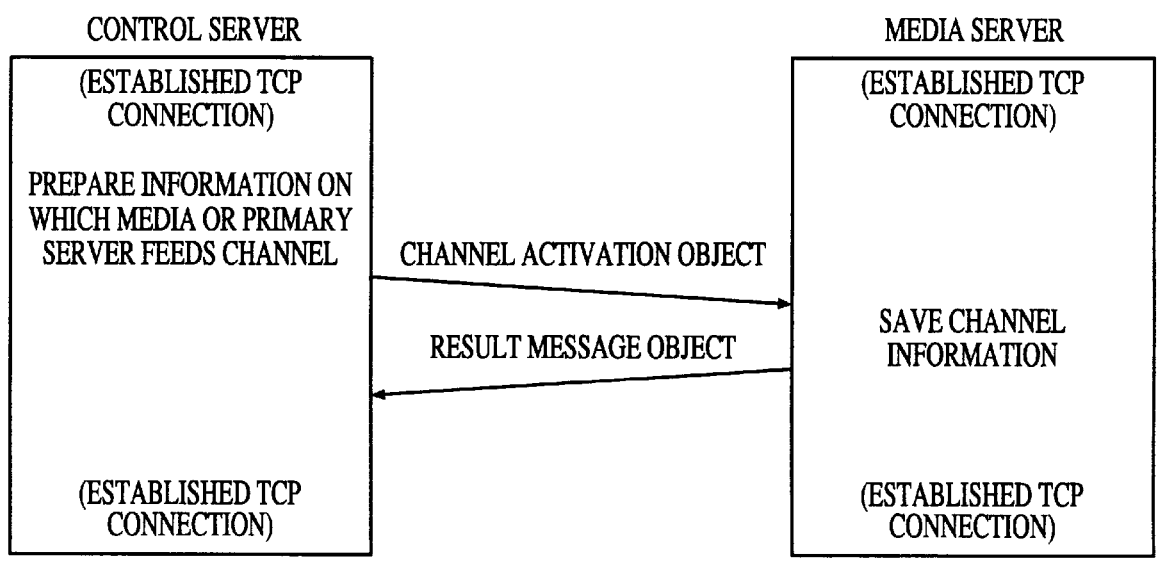

FIG. 15 illustrates what happens when a Control Server needs to provide a channel. First it sends a Channel Activation Object to one of the Media Servers that it manages across the open TCP connection described previously. This object indicates to the Media Server that it should start receiving the channel identified and from where it should receive it.

Figure 16A:
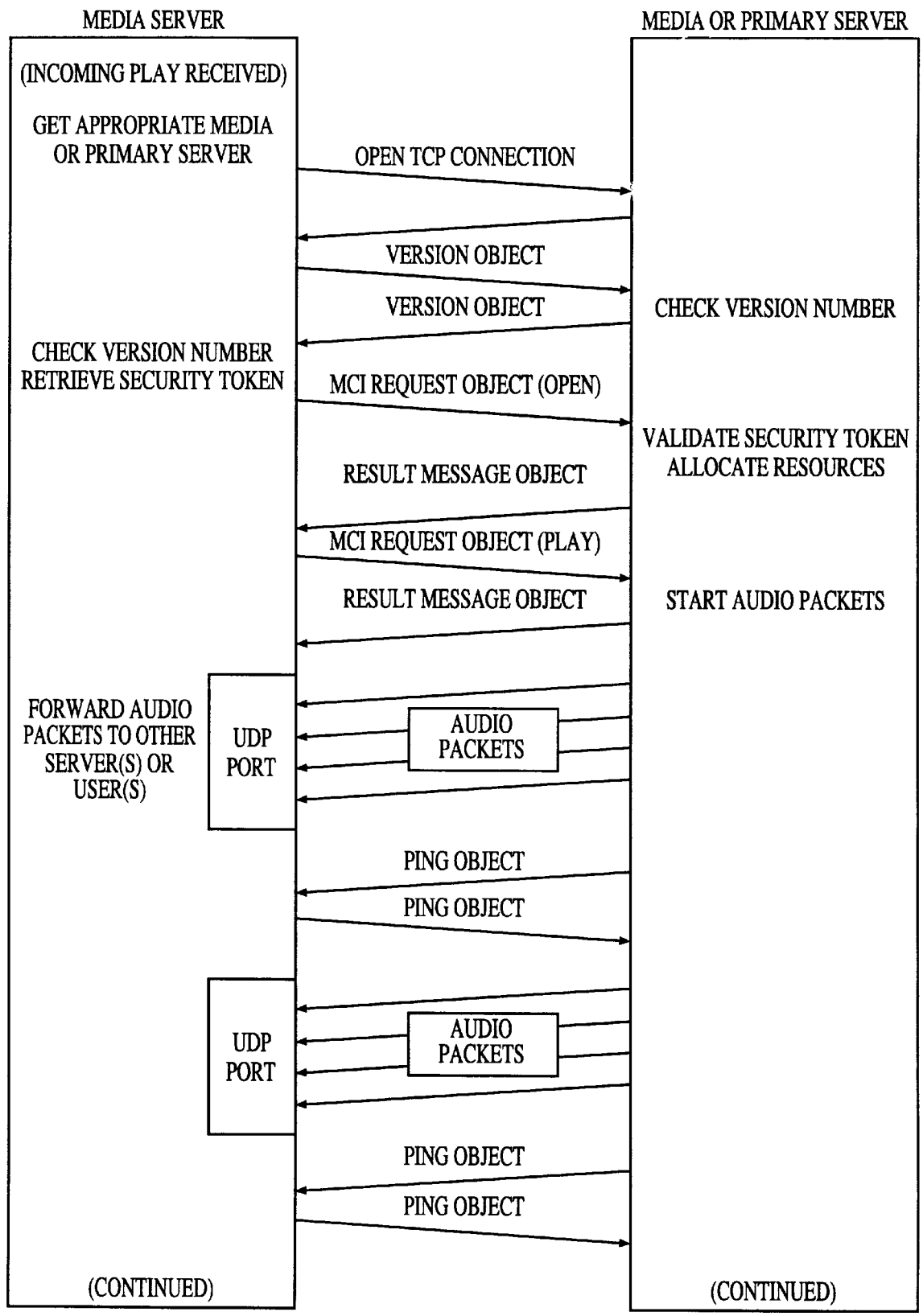
Figure 16B:
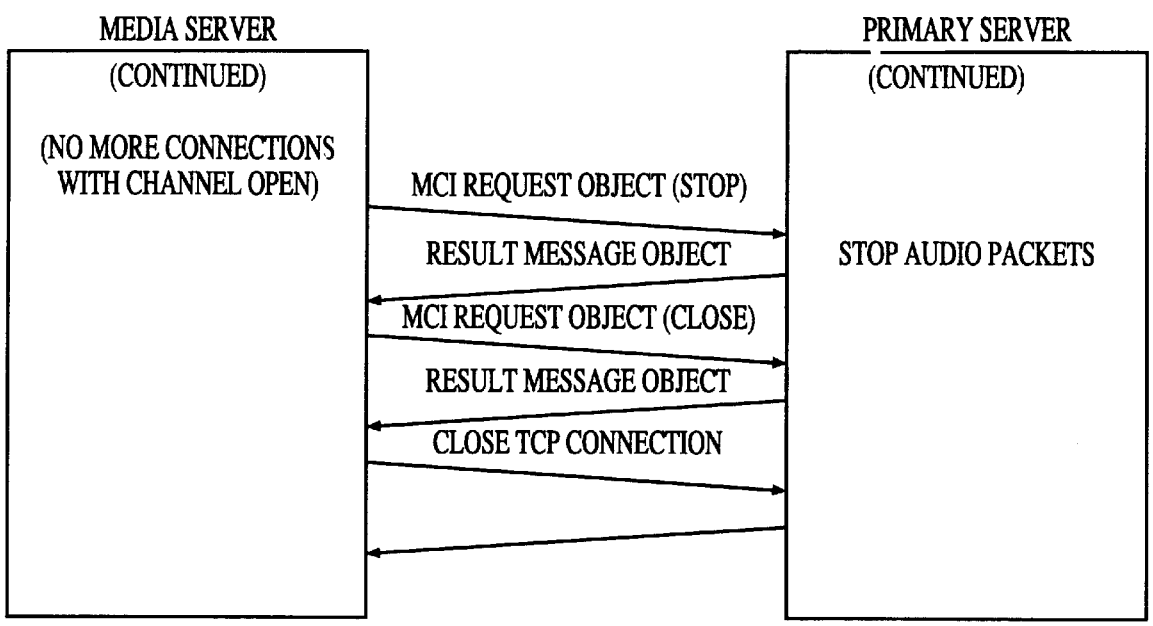

In FIGS. 16A and 16B depict how the Media Server requests distribution of an audio channel from another Media Server or from a Primary Server. This sequence is much the same as that in which a User requests the distribution of audio information from a Media Server. Note that a Media Server receives a single incoming stream for each channel that it is carrying and will then redistributes this stream to all Users or other Media Servers that request it.

Figure 17:
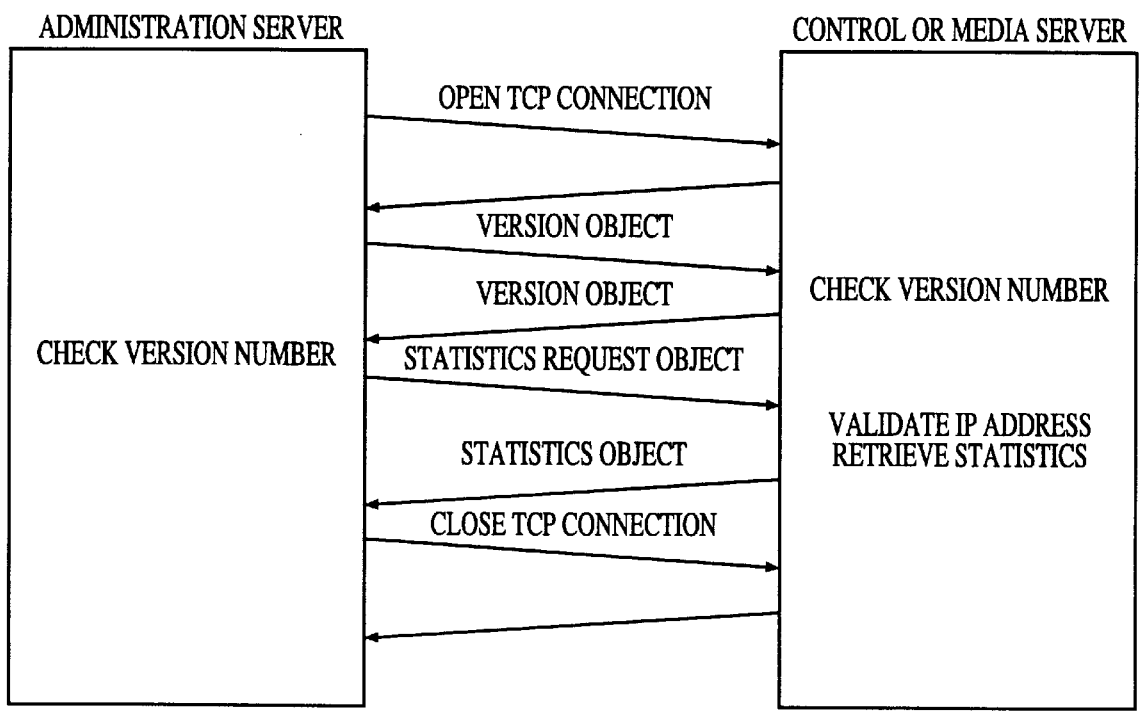

Finally, FIG. 17 illustrates the statistics request sequence. This sequence is used by the Administration Server to gather information from the Media Servers and Control Servers in order to manage the overall system. It can use this information to detect failures and to balance load as the dynamic conditions change. As indicated above, it can also use this information to monitor which Users are listening to which channel or whether Users stop listening to a channel at any time, such as during the play of a particular song. It can also use this information to control the advertising content that is downloaded to a particular User in advance of receipt of regular audio programming and/or monitor the delivery of advertising to the Users.

The control architecture described in this section is scalable to handle any number of Users. Note that the User registration process only happens once for each subscriber and the login process only happens once per session. These interactions, which require the Administration Server are expected to constitute a very small percentage of the overall system bandwidth. If the Administration Server were to become a bottleneck, however, it would be possible to duplicate it and to have the database it maintains distributed and automatically updated to guarantee consistency.

The Control Servers are distributed throughout the network and can handle the lower level interactions with the Users and the Media Servers. A single Control Server can handle preferably on the order of ten Media Servers up to several hundred Users. The bitrate among the Users, the Control Servers and the Media Servers is expected to be small in comparison to the audio transmission bitrate. The Ping Objects normally only involve the User and the nearest Media Server. They are also low in overhead since they are small and only get transmitted infrequently.

III. User Interface

The User interface is provided by the client application running on an individual computer and its associated graphical interface. In the preferred embodiment the User interface is available for 32-bit Windows (95 and NT), Macintosh and UNIX platforms. Preferably anyone on the Internet can freely download a copy of the client software and install it in their computer.

Figure 18:
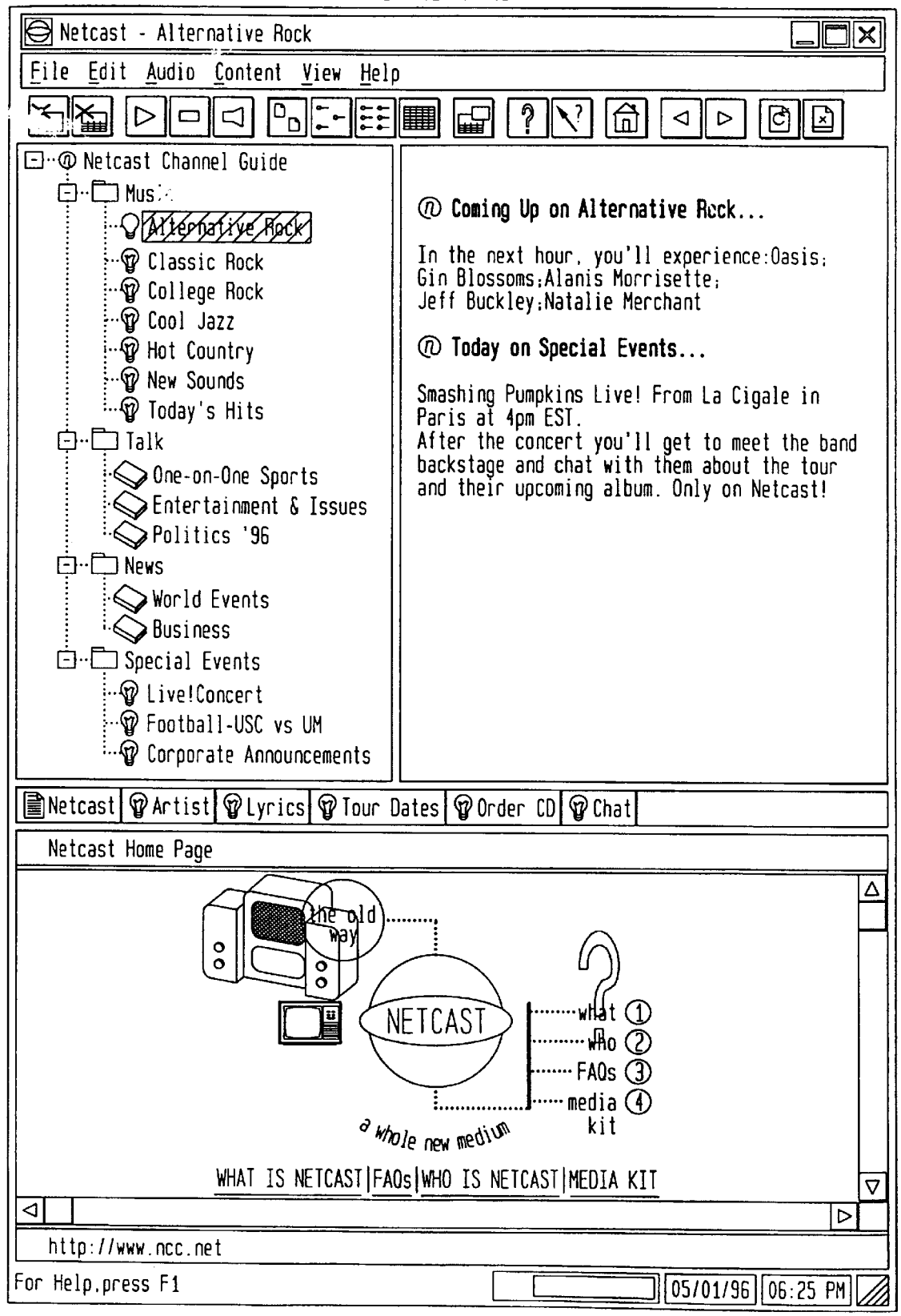
FIGS. 18 and 19 depict the user interface for control of the system of FIG. 1.

FIG. 18 illustrates the main User screen in the preferred embodiment. The screen is composed of three sections: channel guide (upper left frame), program guide (upper right frame), and multimedia frame (lower half of screen). The channel guide lists, as a tree hierarchy, the channels that are available from the system. The User selects a channel from the list of those displayed on the channel guide. The program guide provides information pertaining to the channel selected. This information can be a detailed schedule of the programming that has played or will be playing on the channel selected. Additionally, other relevant information will be displayed in this frame, for example, a notice regarding an upcoming special event on another channel. The multimedia frame provides an integrated web browser that displays information via a series of tabbed sections.

The information contained in the channel guide, program guide, and the tabs of the multimedia frame is dynamically transmitted to the client. For example, if a new channel begins operation, the client application can immediately display it as being available. Furthermore, the tabs displayed can be specifically relevant depending on what song is playing. For example, tabs displaying the album cover, information on the artist, song lyrics, tour dates can be displayed. Additionally, as shown in the example in FIG. 18, a tab can be available allowing the User to place an order for the CD or allowing the User to participate in a chat session related to the channel.

Figure 19:
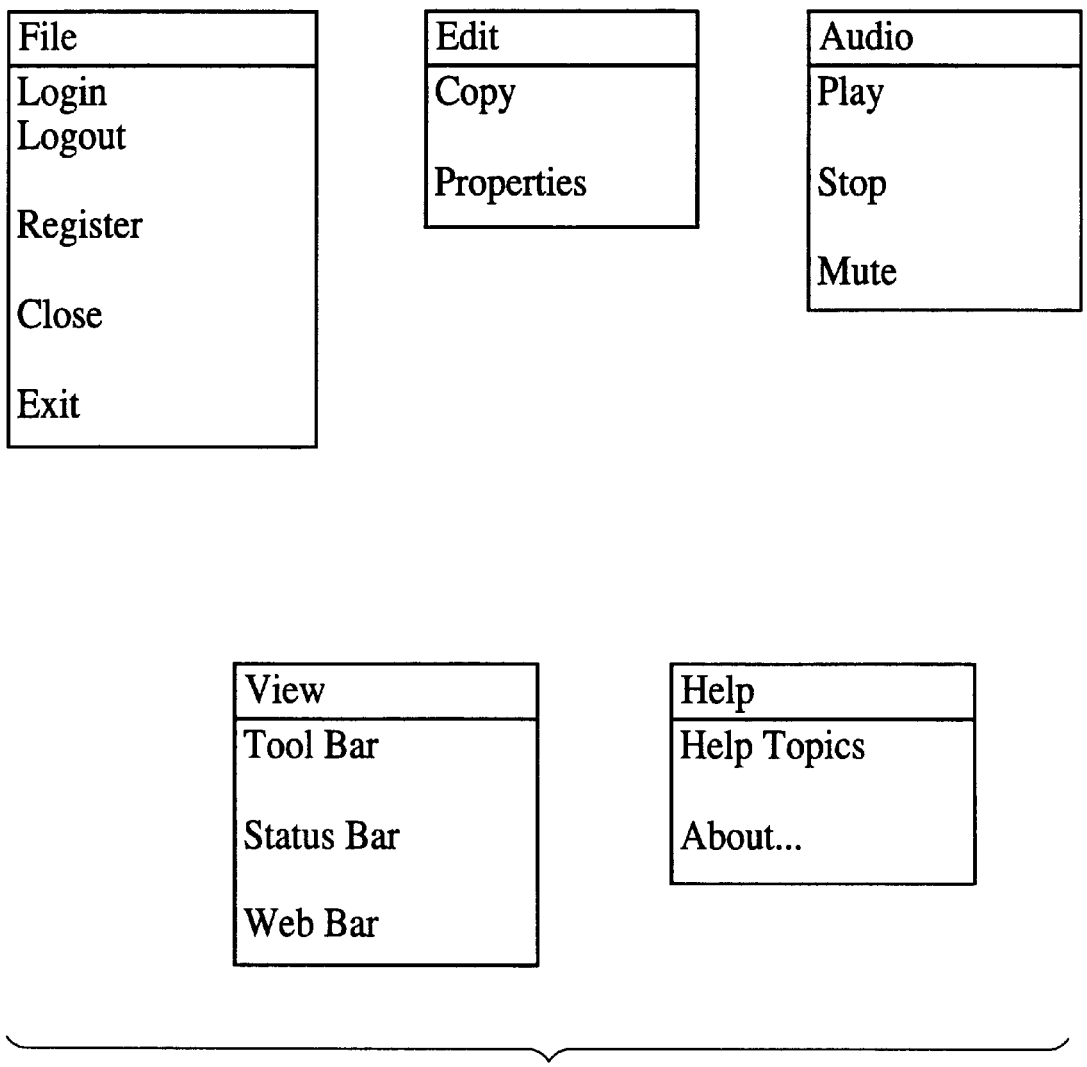

FIG. 19 illustrates the key pull-down menus available in the main User screen in the preferred embodiment. Table 3 provides a description of each of the functions available through the pull down menus, as shown in FIG. 19.

As will be apparent to those skilled in the art, numerous modifications may be made within the spirit and scope of the invention.

TABLE 3

| Pull-Down Menu Functions | | |
| --- | --- | --- |
| Menu Choice | Menu Sub-Choice | Description |
| File | Login | Allows the User to login to the system. |
|  | Logout | Allows the User to logout from the system. |
|  | Register | Brings up a dialog so that the User can register with |

TABLE 3-continued

| Pull-Down Menu Functions | | |
| --- | --- | --- |
| Menu Choice | Menu Sub-Choice | Description |
|  |  | the system for the first time. |
|  | Close | Minimizes the screen. |
| Edit | Copy | Allows the User to copy the selection on to the clipboard. |
|  | Properties | Allows the User to set various properties. |
| Audio | Play | Begins playing the selected channel. |
|  | Stop | Stops playing the selected channel. |
|  | Mute | Stops the playing of audio |
| View | Tool Bar | Display or hide the tool bar (providing access to pull-down menu functions). |
|  | Status Bar | Display or hide the status bar normally situated at bottom of the screen. |
|  | Web Bar | Display or hide the tool bar section that provides access to the web browser functions. |
| Help | Help Topics | Brings up a list of available online help topics. |
|  | About . . . | Displays summary infirmation regarding this application, such as version number, copyright information, and so on. |

What is claimed is:

1. A method for transmitting message packets over a communications network comprising the steps of:

converting at least one stream of audio and/or visual information into at least one stream of addressed digital packets complying with the specifications of a network communication protocol, for each stream, routing such stream to one or more users, controlling the routing of the stream of packets in response to selection signals received from the users, and including in at least one stream of packets at least some advertising information that is varied depending on the identity of the user to whom the at least one stream of packets is delivered.

2. The method of claim 1, wherein the advertising information is varied depending on the user's demographic group.

3. The method of claim 1, further comprising the step of monitoring the reception of packets by the users and accumulating records that indicate which streams of packets were received by which users, and wherein the advertising information is varied based on the step of monitoring.

4. The method of claim 1, wherein the advertising information is varied based on records that are accumulated that indicate which users have received which packets.

5. The method of claim 1 wherein the advertising information is inserted into the stream of audio and/or visual information before such stream is converted into a stream of packets.

6. The method of claim 1 wherein the advertising information is inserted into the stream of audio and/or visual information at a location remote from the user.

7. The method of claim 1 where in the advertising information content is inserted into the stream of audio and/or visual packets at the user.

8. The method of claim 1 wherein records are accumulated that indicate how many users received specific advertising information.

9. The method of claim 1 wherein at least one stream of packets comprises copyrighted selections and records are accumulated that indicate which users received specific copyrighted selections.

10. The method of claim 1 wherein at least one stream of packets comprises audio and/or visual selections and records are accumulated that indicate which users listened to and/or viewed the entire selection.

11. A method for transmitting at least one stream of audio and/or visual information over a communications network to one or more users comprising the steps of:

controlling the routing of the stream of information through the network in response to selection signals received from the users, including in at least one stream of information at least some advertising information that is varied depending on the identity of the user to whom the advertising information is provided.

12. The method of claim 11, wherein the advertising information is varied depending on the user's demographic group.

13. The method of claim 11, further comprising the step of monitoring the reception of streams of information by the users and accumulating records that indicate which streams of information were received by which users, and wherein the advertising information is varied based on the step of monitoring.

14. The method of claim 11, wherein the advertising information is varied based on records that are accumulated that indicate which users have received which streams of information.

15. The method of claim 11 wherein the advertising information is inserted into the stream of audio and/or visual information before such stream is converted into a stream of packets.

16. The method of claim 11 wherein the advertising information is inserted into the stream of audio and/or visual information at a location remote from the user.

17. The method of claim 11 wherein the advertising information is inserted into the stream of audio and/or visual information at the user.

18. The method of claim 11 wherein records are accumulated that indicate how many users received specific advertising information.

19. The method of claim 11 wherein at least one stream of information comprises copyrighted selections and records are accumulated that indicate which users received specific selections.

20. The method of claim 11 wherein at least one stream of information comprises audio and/or visual selections and the records that are accumulated indicate which users listened to and/or viewed the entire selection.

21. A communication system comprising:

means for converting at least one stream of audio and/or visual information into a stream of addressed digital packets complying with the specifications of a network communication protocol, means for routing such stream via a communication network to selected users, means for controlling the routing of the stream of packets in response to selection signals received from the users, and means for including in the stream of packets at least some advertising information that is varied depending on the identity of the user to whom the advertising information is sent.

22. The communication system of claim 21, wherein the advertising information is varied depending on the user's demographic group.

23. The communication system of claim 21, further comprising means for monitoring the reception of streams of information by the users and for accumulating records that indicate which streams of information were received by which users, and wherein the advertising information is varied based on the step of monitoring.

24. The communication system of claim 21, wherein the advertising information is varied based on records that are accumulated that indicate which users have received which streams of information.

25. The method of claim 21 wherein the advertising information is inserted into the stream of audio and/or visual information before such stream is converted into a stream of packets.

26. The method of claim 21 wherein the advertising information is inserted into the stream of audio and/or visual information at a location remote from the user.

27. The method of claim 21 wherein the advertising information content is inserted into the stream of audio and/or visual packets at the user.

28. The method of claim 21 wherein records are accumulated that indicate how many users received specific advertising information.

29. The method of claim 21 wherein at least one stream of information comprises copyrighted selections and records are accumulated that indicate which users received specific selections.

30. The method of claim 21 wherein at least one stream of information comprises audio and/or visual selections and the records that are accumulated indicate which users listened to and/or viewed the entire selection.

\* \* \* \* \*

UNITED STATES PATENT AND TRADEMARK OFFICE
CERTIFICATE OF CORRECTION

PATENT NO.    : 6,119,163
DATED         : September 12, 2000
INVENTOR(S)   : Monteiro et al.

It is certified that error appears in the above-identified patent and that said Letters Patent is hereby corrected as shown below:

Column 1,
Lines 26, 29, 30 and 50, "which", each occurrence, should read -- that --;
Line 39, "capability analogous" should read -- capability, analogous --;
Line 41, "nodes are" should read -- nodes, is --;
Line 66, "1458 which" should read -- 1458, which --.

Column 2,
Line 41, "which" should read -- which: --;
Line 54, "which" should read -- that --.

Column 3,
Lines 20, 28, 32, 33 and 34, "which", each occurrence, should read -- that --;
Lines 22-23, "Media Server which" should read -- Media Server that --;
Line 29, "at a major points" should read -- at major points --.

Column 4,
Line 15, "which" should read -- that --.

Column 5,
Lines 42 and 47, "which", each occurrence, should read -- that --.

Column 6,
Line 1, "dynamic, Users" should read -- dynamic; Users --;
Lines 7 and 56, "which", each occurrence, should read -- that --;
Line 44, "to a multicast" should read -- to multicast --.

Column 7,
Lines 4 and 23, "which", each occurrence, should read -- that --;
Line 24, "monitor" should read -- monitors --;
Line 32, "audiostream" should read -- audio stream --.

Column 8,
Line 11, "36 which" should read -- 36, which --.

Column 13,
Line 36, "invoke it which" should read -- invoke it, which --.

Column 14,
Line 17, "ask" should read -- asks --.

UNITED STATES PATENT AND TRADEMARK OFFICE
CERTIFICATE OF CORRECTION

PATENT NO. : 6,119,163
DATED : September 12, 2000
INVENTOR(S) : Monteiro et al.

It is certified that error appears in the above-identified patent and that said Letters Patent is hereby corrected as shown below:

Column 15,
Line 52, "Server validates" should read -- Server, validates --;
Line 53, "generate" should read -- generates --.

Column 16,
Line 45, "and will then" should read -- and then --;
Line 64, "Server are" should read -- Server, are --.

Column 18,
Line 27, Table 3, "infirmation" should read -- information --.

Signed and Sealed this

Third Day of June, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,119,163
DATED : September 12, 2000
INVENTOR(S) : Monteiro and Butterworth It is certified that error appears in the above-identified patent and that said Letters Patent is hereby corrected as shown below:

Title page,
Item [56], References Cited, OTHER PUBLICATIONS,
"RealAudio Administrator's Guide" delete "Release 1.1" and insert -- Release 1.01 --.

Signed and Sealed this

Twenty-first Day of June, 2005

JON W. DUDAS
*Director of the United States Patent and Trademark Office*